United States Patent
Anzawa et al.

(10) Patent No.: US 6,642,693 B2
(45) Date of Patent: Nov. 4, 2003

(54) VOLTAGE EQUALIZING APPARATUS FOR BATTERY DEVICES

(75) Inventors: Seiichi Anzawa, Nagano (JP); Hiroshi Nishizawa, Nagano (JP); Fujio Matsui, Tokyo (JP)

(73) Assignees: Nagano Japan Radio Co., Ltd., Nagano (JP); Fuji Jukogyo Kabushiki Kaisha, Tokyo (JP)

( * ) Notice: Subject to any disclaimer, the term of this patent is extended or adjusted under 35 U.S.C. 154(b) by 162 days.

(21) Appl. No.: 09/989,610

(22) Filed: Nov. 20, 2001

(65) Prior Publication Data

US 2002/0109482 A1 Aug. 15, 2002

Related U.S. Application Data

(63) Continuation-in-part of application No. 09/811,061, filed on Mar. 16, 2001.

(30) Foreign Application Priority Data

Nov. 21, 2000 (JP) .................................... P. 2000-354096
Sep. 28, 2001 (JP) .................................... P. 2001-304003

(51) Int. Cl.$^7$ ................................................. H02J 7/00
(52) U.S. Cl. ........................................ 320/119; 320/118
(58) Field of Search ................................. 320/119, 118, 320/116, 117; 363/20, 15, 37

(56) References Cited

U.S. PATENT DOCUMENTS 6,373,223 B1 * 4/2002 Anzawa et al. .............. 320/118

* cited by examiner

*Primary Examiner*—Lawrence Luk
(74) *Attorney, Agent, or Firm*—Rosenthal & Osha L.L.P.

(57) ABSTRACT a voltage equalizing apparatus for battery devices includes a core, a plurality of first closed circuits and a second closed circuit. The plurality of first closed circuits each includes one of a plurality of first battery devices interconnected in series, one of a plurality of secondary windings magnetically connected with each other through the core, and one of a plurality of first switching devices. The second closed circuit includes a second battery device, a primary winding magnetically connected with the secondary windings through the core, and a second switching device. The first switching devices and the second switching device are alternately turned ON and OFF to equalize the output voltages of the first battery devices. The first switching devices continue to be turned ON after completion of the transportation of the exciting energy stored in the core. In the voltage equalizing apparatus for battery devices, the ON-duration ratio $T_{ON2}/T_{ON1}$ between the ON duration $T_{ON2}$ of the first switching devices S2 to Sn and the ON duration $T_{ON1}$ of the second switching device S1 is set so that the voltages of the first battery devices B2 to Bn become a predetermined voltage.

22 Claims, 12 Drawing Sheets

1

VOLTAGE EQUALIZING APPARATUS FOR BATTERY DEVICES

CROSS REFERENCE TO RELATED APPLICATION

This application is a continuation-in-part of application Ser. No. 09/811,061 filed Mar. 16, 2001, now pending.

BACKGROUND OF THE INVENTION

1. Field of the Invention

The present invention relates to an apparatus for performing energy transfer among a plurality of battery devices interconnected in series and carried on an electric car or a hybrid car and thereby equalizing each voltage across each of the battery devices interconnected in series.

2. Description of the Related Art

The related art in this field is disclosed, for example, in Japanese Laid-Open Patent Publication No. Hei 11-176483 and U.S. Pat. No. 5,003,244. In the configuration of the former patent as shown in FIG. 7, the output voltages E1 to En of a plurality of battery devices 1-1 to 1-n are interconnected in series. For the purpose of the balance correction of the output voltages of the battery devices, a switching transistor 2 connected to a primary coil Np in series is turned ON and OFF in response to the output voltages. A converter is composed of a plurality of secondary coils Ns each corresponding to each of the battery devices and wound on a common transformer core with the primary coil. The connection thereof is configured such that the secondary output of the converter charges each battery device. When the switching transistor 2 is periodically turned ON and OFF, a voltage depending on the turn number ratio is generated in each secondary coil Ns. Since the secondary coils are wound on the common core, the induced charging current concentrates in a battery device having the lowest voltage among the battery devices, whereby the battery devices are equalized in voltage.

In this former circuit, in addition to that the switching transistor is simply turned ON and OFF, the current Ip flowing in the primary coil Np is controlled depending on the load current Io.

Further, in the configuration of the latter patent as shown in FIG. 8, the output voltages of a plurality of battery devices 25, 26, 27, 28 are connected in series. For the purpose of the balance correction of the output voltages of the battery devices, a switching transistor 34 connected to a primary coil 16 in series is turned ON and OFF in response to the input from a power supply 30. A converter 14 is composed of a plurality of secondary coils 21, 22, 23, 24 each corresponding to each of the battery devices and wound on a transformer core 18 common to the primary coil 16. The connection thereof is configured such that the secondary output of the converter 14 charges each battery device. When the switching transistor 34 is periodically turned ON and OFF, a voltage depending on the turn number ratio is generated in each secondary coil. Since the secondary coils are wound on the common core, the induced charging current concentrates in a battery device having the lowest voltage among the battery devices, whereby the battery devices are equalized in voltage.

There has been the following problems in such above-mentioned related art apparatuses for equalizing the voltages across each of a plurality of energy storage device (battery devices) interconnected in series by means of the switching of a converter.

(a) In each above-mentioned related art apparatus, the magnetizing force is one directional in the transformer core for the ON and OFF duration of the switching device (transistor) Accordingly, the range of the change in magnetic flux density of the core is small, and hence the utilization of the core is less efficient. The lower efficiency in core utilization implies the necessity of a larger cross section in the core for a specific output power, thereby causing the problems of a larger apparatus and a higher cost.

Further, the switching ON and OFF of the switching device for the voltage equalizing causes a problem that electric charge stored in the capacitance existing between the terminals of the switching device for the OFF duration of the switching device is discharged by the next ON operation thereby to cause a power loss and a noise due to the short-circuit current.

(b) In each above-mentioned related art apparatus, energy stored in the transformer for the ON duration of the switching device is discharged for the next OFF duration of the switching device, thereby charging a battery device having the lowest voltage among the battery devices thereby to equalize the output voltages of the battery devices. Accordingly, the amount of equalizing energy is only the amount of energy stored for the ON duration of the switching device. Therefore, in order to increase the equalizing action, a larger switching device is necessary for increasing the equalizing current. However, this larger switching device causes a larger apparatus and hence a higher cost, as is the above-mentioned case (a). Further, since each battery device has an internal resistance, the higher current from the switching device causes a larger voltage drop across the internal resistance, thereby increasing apparent output voltage of the battery device in charging. This causes a problem of reducing the precision of output voltage equalizing.

In addition to resolving the above-mentioned problems, earnestly desired are short-time equalization of the output voltages of the battery devices, reduction of energy loss after the equalization operation, and setting of the voltage at an arbitrary value after the equalization.

SUMMARY OF THE INVENTION

An object of the present invention is to resolve the above-mentioned problems (a) and (b) thereby to provide a voltage equalizing apparatus having a high efficiency and a high precision of equalizing and being of a small size. Further, an object of the present invention is to provide a voltage equalizing apparatus capable of equalizing to a desired voltage in a short time, reducing the energy loss after the completion of equalization, and setting the voltage after the equalization to be an arbitrary value.

An aspect of the invention for resolving the above-mentioned problems is a voltage equalizing apparatus for battery devices comprising:

a core;

a plurality of first closed circuits each composed of one of a plurality of first battery devices (1-1 to 1-n) interconnected in series, one of a plurality of secondary windings (4-1 to 4-n) magnetically connected with each other through the core (3), and one of a plurality of first switching devices (2-1 to 2-n); and a second closed circuit composed of a second battery device (1-m), a primary winding (4-m) magnetically connected with the secondary windings through the core, and a second switching device (2-m);

wherein the first switching devices and the second switching device are alternately turned ON and OFF to equalize the output voltages of the first battery devices;

when the second switching device is turned ON, exciting energy stored in the core is transported to the first battery devices through the first switching devices; and the first switching devices continue to be turned ON after the transportation of the exciting energy is completed.

According to the present invention, when the second switching device is turned ON, exciting energy stored in the core is transported to the first battery devices through the first switching devices, and the first switching devices continue to be turned ON after the transportation of the exciting energy is completed.

In another configuration, a detector for detecting the variation in the output voltages of the first battery devices (1-1 to 1-n) is provided, whereby in case of a large variation, the ON duration of the second switching device (2-m) and/or the first switching devices (2-1 to 2-n) is extended.

In another configuration, in case of a small variation in the output voltages of the first battery devices, the ON/OFF operation of the first switching devices and the second switching device is stopped, and/or the ON duration of the first switching devices and the second switching device is extremely shortened. This avoids power loss and noise due to unnecessary voltage equalizing operation in case of the small variation in the output voltages.

In another configuration, in case that the variation in the output voltages of the first battery devices becomes smaller than a predetermined value, the ON duration of the first switching devices and/or the second switching device is shortened for the reduction of power consumption for the equalizing. By virtue of this, the precision increases in equalizing the terminal voltages of the battery devices.

In another configuration, in case that a current greater than or equal to a predetermined value flows through the first battery devices, the ON/OFF operation of the first switching devices and the second switching device is stopped, and/or the ON duration of the first switching devices and the second switching device is extremely shortened. By virtue of this, the voltage equalizing operation is substantially stopped when the cell voltage detection of each battery device is affected by a voltage drop generated across the internal resistance of the battery device by a high current flowing through the first battery devices.

In another configuration, during the charge from an external power supply and the discharge to an external load by the first battery devices, the ON/OFF operation of the first switching devices and the second switching device is stopped, and/or the ON duration of the first switching devices and the second switching device is extremely shortened. By virtue of this, the voltage equalizing operation is stopped, even without current detection, automatically in response to the operation of a switch (S11) for switching the charge and discharge modes.

In another configuration, when the first switching devices and the second switching device are alternately turned ON and OFF, there is a pause in an interval from the switching-OFF of the first switching devices to the switching-ON of the second switching device and in an interval from the switching-OFF of the second switching device to the switching-ON of the first switching devices. By virtue of this, each switching device can be turned ON under the condition of substantially no electric charge in the capacitance component between the terminals of the switching device in question (zero-volt switching)

Another aspect of the invention is an apparatus for equalizing circuit voltages, comprising:

a plurality of circuits, wherein in each circuit, each of a plurality of closed circuits is constituted of each of a plurality of first battery devices interconnected in series, each of a plurality of secondary windings magnetically coupled with each other, and each of a plurality of first switching devices, and wherein each circuit comprises a transformer having at least a circuit equalizing winding magnetically coupled with the secondary windings in common;

wherein the circuit equalizing windings each provided in each circuit are interconnected in parallel, wherein at least one of the circuits is provided with an exciting winding magnetically coupled with the secondary windings involved in the circuit in question, wherein a closed circuit is constituted by the serial connection of the exciting winding, a second battery device, and a second switching device, and wherein when the second switching device is turned ON, exciting energy stored in the core is transported to the first battery devices through the first switching devices, and the first switching devices continue to be turned ON after the transportation of the exciting energy is completed.

Accordingly, there is a further effect that a necessary output voltage can be obtained by an appropriate combination of single circuits.

In another configuration alternative to claim 9, when the first switching device is turned ON, exciting energy stored in the core is transported to the second switching device through the second switching device, and the second switching device continues to be turned ON after the transportation of the exciting energy is completed.

By virtue of this, voltage equalizing operation similar to that within each single circuit is achieved also among the circuits, whereby overall voltage equalizing operation is obtained.

The combined use of the exciting winding and the circuit equalizing winding permits a miniaturization of the apparatus.

Another aspect of the invention is a voltage equalizing apparatus for battery devices comprising:

a core;

a plurality of first closed circuits each composed of one of a plurality of first battery devices interconnected in series, one of a plurality of secondary windings magnetically connected with each other through the core, and one of a plurality of first switching devices;

a second closed circuit composed of a second battery device, a primary winding magnetically connected with the secondary windings through the core, and a second switching device; and a controller for outputting a control signal for causing the second switching device and the first switching devices to be alternately turned ON and OFF, thereby causing the energy transportation between the second battery device and each of the first battery devices, and thereby equalizing the voltages of the first battery devices;

wherein the controller sets the ON-duration ratio between the ON duration of the second switching device and the ON duration of the first switching devices so that the voltages of the first battery devices become a predetermined voltage.

By virtue of this, voltage equalization is carried out and a predetermined voltage is obtained.

Another aspect of the invention is a voltage equalizing apparatus for battery devices comprising:

a core;

a plurality of first closed circuits each composed of one of a plurality of first battery devices interconnected in series, one of a plurality of secondary windings magnetically connected with each other through the core, and one of a plurality of first switching devices;

a second closed circuit composed of a second battery device, a primary winding magnetically connected with the secondary windings through the core, and a second switching device; and a controller for outputting a control signal for causing the second switching device and the first switching devices to be alternately turned ON and OFF, thereby causing the energy transportation between the second battery device and each of the first battery devices, and thereby equalizing the voltages of the first battery devices;

wherein the controller sets the ON-duration ratio between the ON duration of the second switching device and the ON duration of the first switching devices so that the voltages of the first battery devices exceed a predetermined voltage, and wherein before the voltages of the first battery devices exceed the predetermined voltage, the controller resets the ON-duration ratio so that the voltages of the first battery devices become the predetermined voltage.

By virtue of this, the time necessary for the energy transportation from the second battery device to each of the first battery devices is further reduced.

In another configuration, the controller sets the frequency which is the reciprocal of the sum duration of the ON duration of the second switching device and the ON duration of the first switching devices, to be a frequency lower than a normal value, thereby increasing the amount of energy transported between the second battery device and each of the first battery device in a unit time so that the voltages of the first battery devices become the predetermined voltage in a short time. By virtue of this, the voltages of the first battery devices are set to the predetermined voltage in a shorter time.

In another configuration, when the transportation of a predetermined amount of energy between the second battery device and each of the first battery devices is completed and when the voltages of the first battery devices have become approximately the predetermined voltage, the controller sets the frequency which is the reciprocal of the sum duration of the ON duration of the second switching device and the ON duration of the first switching devices, to be a frequency higher than the normal value. This permits reduction of the circulation energy after the equalization is completed, and hence the energy loss is reduced.

In another configuration, when the transportation of a predetermined amount of energy between the second battery device and each of the first battery devices is completed and when the voltages of the first battery devices have become approximately the predetermined voltage, the controller turns OFF the second switching device and the first switching devices. This permits reduction of energy loss.

In another configuration, a third switching device and a third battery device are further provided in the second closed circuit composed of, the second battery device, the primary winding, and the second switching device, a closed circuit is formed by the second battery device, the third switching device, and the third battery device, a closed circuit is formed by the primary winding, the second switching device, and the third battery device, and when the transportation of a predetermined amount of energy between the second battery device and each of the first battery devices is completed, the controller turns OFF the third switching device and causes the second switching device and the first switching devices to continue, thereby causing the equalization of the voltages of the first battery devices to continue.

When almost all of the energy to be transported has been completed, equalization is carried out efficiently in case that only a small amount of energy is transported between the primary winding and the secondary windings. Accordingly, energy loss is reduced when the third switching device is turned OFF and when the third battery device having an energy capacity smaller than that of the second battery device is used for equalization.

Another aspect of the invention is a voltage equalizing apparatus for battery devices comprising:

a core;

a plurality of first closed circuits each composed of one of a plurality of first battery devices interconnected in series, one of a plurality of secondary windings magnetically connected with each other through the core, and one of a plurality of first switching devices;

a plurality of second closed circuits each composed of one of a plurality of second battery devices interconnected in series, one of a plurality of primary windings magnetically connected with the secondary windings through the core, and one of a plurality of second switching devices; and a controller for outputting a control signal for causing the second switching devices and the first switching devices to be alternately turned ON and OFF, thereby causing the energy transportation between each of the second battery devices and each of the first battery devices, and thereby equalizing the voltages of the second battery devices and/or the first battery devices;

wherein the controller sets the ON-duration ratio between the ON duration of the second switching devices and the ON duration of the first switching devices so that the voltages of the second battery devices or the first battery devices become a predetermined voltage.

This permits the two-directional energy transportation and the voltage equalization between each of the second battery devices and each of the first battery devices. This control method further permits a small voltage equalizing apparatus of low noise. Further, when the ON duration is set as described above and the activation of the second switching devices and the first switching devices is controlled, the voltages of the second battery devices and the first battery devices can be set to a predetermined value. Accordingly, equalization is achieved, and a predetermined voltage is obtained.

Another aspect of the invention is a voltage equalizing apparatus for battery devices comprising:

a core;

a plurality of first closed circuits each composed of one of a plurality of first battery devices interconnected in series, one of a plurality of secondary windings magnetically connected with each other through the core, and one of a plurality of first switching devices;

a plurality of second closed circuits each composed of one of a plurality of second battery devices interconnected in series, one of a plurality of primary windings magnetically connected with the secondary windings through the core, and one of a plurality of second switching devices; and a controller for outputting a control signal for causing the second switching devices and the first switching devices to be alternately turned ON and OFF, thereby causing the energy transportation between each of the second battery devices and each of the first battery devices, and thereby equalizing the voltages of the second battery devices and/or the first battery devices;

wherein the controller sets the ON-duration ratio between the ON duration of the second switching devices and the ON duration of the first switching devices so that the voltages of the second battery devices or the first battery devices exceed a predetermined voltage, and wherein before the voltages of the second battery devices or the first battery devices exceed the predetermined voltage, the controller resets the ON-duration ratio so that the voltages of the second battery devices or the first battery devices become the predetermined voltage.

This permits further reduction of the time necessary for the energy transportation from each of the second battery devices to each of the first battery devices or vice versa.

In another configuration, the controller sets the frequency which is the reciprocal of the sum duration of the ON duration of the second switching devices and the ON duration of the first switching devices, to be a low frequency, thereby increasing the amount of energy transported between each of the second battery devices and each of the first battery devices in a unit time so that the voltages of the second battery devices or the first battery devices become the predetermined voltage in a short time. By virtue of this, the voltages of the second battery devices or the first battery devices are equalized to the predetermined voltage in a shorter time.

In another configuration, when the transportation of a predetermined amount of energy between each of the second battery devices and each of the first battery devices is completed and when the voltages of the second battery devices or the first battery devices have become approximately the predetermined voltage, the controller sets the frequency which is the reciprocal of the sum duration of the ON duration of the second switching devices and the ON duration of the first switching devices, to be a high frequency. This permits reduction of the circulation energy after the equalization is completed, and hence the energy loss is reduced.

In another configuration, when the transportation of a predetermined amount of energy between each of the second battery devices and each of the first battery devices is completed and when the voltages of the second battery devices or the first battery devices have become approximately the predetermined voltage, the controller turns OFF the second switching devices and the first switching devices. By virtue of this, both the second switching devices and the first switching devices are maintained to be OFF simultaneously, whereby energy loss is reduced.

BRIEF DESCRIPTION OF THE DRAWINGS

FIG. 10(a) shows S1.

DETAILED DESCRIPTION OF THE PRESENT INVENTION

The present invention will be described in detail with reference to the accompanying drawings.

First Embodiment

A first embodiment of the present invention is described below with reference to FIG. 1.

Figure 1:
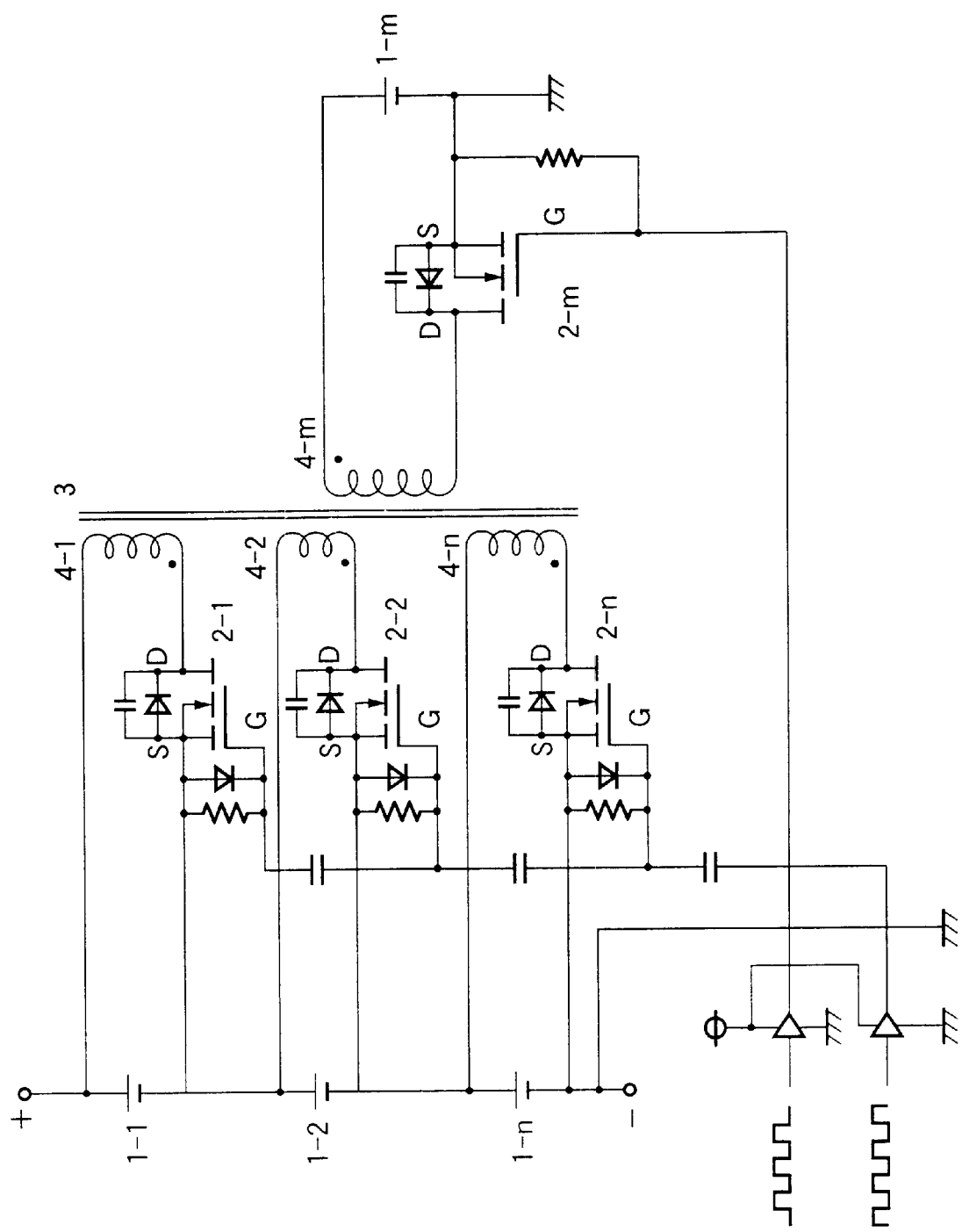
FIG. 1 is a diagram showing a voltage equalizing apparatus for battery devices in accordance with a first embodiment of the invention.

FIG. 1 shows a basic circuit of the present invention. Numerals 1-1 to 1-$n$ designate a plurality of battery devices interconnected in series. Numerals 2-1 to 2-$n$ designates a plurality of first switching devices. Numeral 1-$m$ is a battery device provided separately from the battery devices, and may be in combination with a direct-current power supply, a charger, or a generator. Numeral 2-$m$ is a second switching device for conducting a current from the battery device 1-$m$ to a primary winding 4-$m$ wound on a common core of a transformer 3. The common core of the transformer 3 is further provided with a plurality of secondary windings 4-1 to 4-$n$ for providing charging currents into the battery devices 1-1 to 1-$n$ interconnected in series.

The switching device 2-$m$ and the switching devices 2-1 to 2-$n$ are provided with pulses in opposite polarity as shown in the figure. Accordingly, the conduction thereof is controlled such that the switching devices 2-1 to 2-$n$ are OFF when the switching device 2-$m$ is ON and that the switching devices 2-1 to 2-$n$ are ON when the switching device 2-$m$ is OFF.

Next, the operation of the circuit shown in FIG. 1 is described below with reference to FIG. 2.

Figure 2:
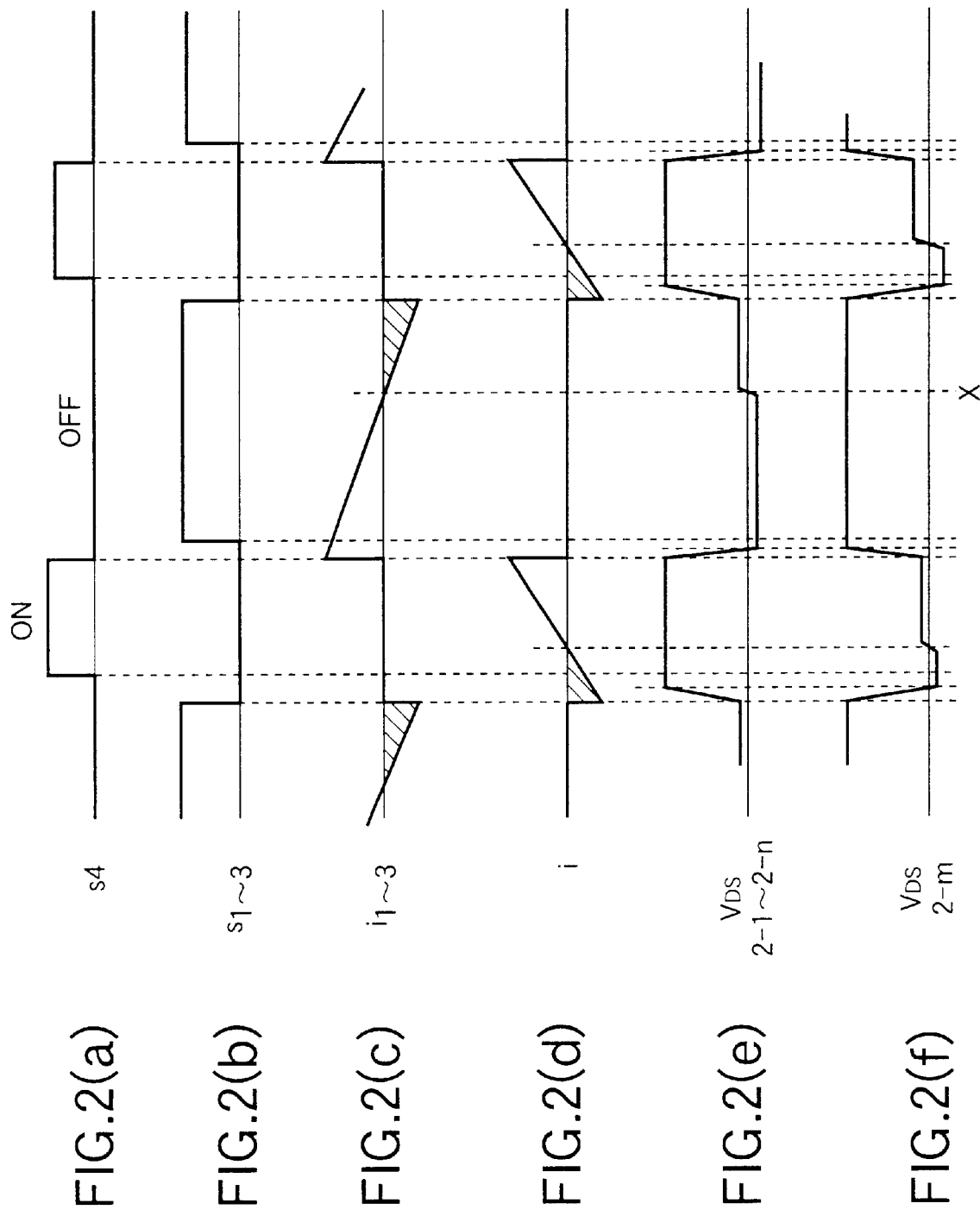
FIGS. 2(a)–(2f) are diagrams showing the operation of a voltage equalizing apparatus for battery devices in accordance with the first embodiment of the invention.

FIG. 2(a) shows the ON and OFF duration of the second switching device 2-$m$. FIG. 2(b) shows the ON and OFF duration of the first switching devices 2-1 to 2-$n$. FIG. 2(*c*) shows charging and discharging currents for the voltage equalizing of the battery devices 1-1 to 1-$n$. These currents flow through the secondary windings 4-1 to 4-$n$. (These currents are different from a charging current from an external charger and a discharging current to an external load supplied to and from the battery devices interconnected in series.) FIG. 2(*d*) shows a current flowing through the primary winding 4-$m$. This current supplies equalizing energy stored in the transformer 3.

A feature of the present invention in the above-mentioned operation is the point that the ON duration of the second switching device 2-$m$ is different from the ON duration of the first switching devices 2-1 to 2-$n$ and that, more specifically, the ON duration of the first switching devices 2-1 to 2-$n$ is set to be longer than the ON duration of the second switching device 2-$m$, whereby the voltage variation of the battery devices interconnected in series is reduced in comparison with the related art.

As described above, the ON duration of the second switching device 2-$m$ and the ON duration of the first switching devices 2-1 to 2-$n$ are set to be different from each other, and the ON duration of the first switching devices 2-1 to 2-$n$ is set to be longer than the other.

The feature that the ON duration of the second switching device 2-$m$ and the ON duration of the first switching devices 2-1 to 2-$n$ are set to be different from each other and that the ON duration of the first switching devices 2-1 to 2-$n$ is set to be longer than the other causes not merely the difference in time duration but also the result that the ON operation of the first switching devices is continued until a time after the completion of release of exciting energy stored in the transformer by an ON operation of the second switching device, into the first battery devices through the first switching devices.

Figure 6:
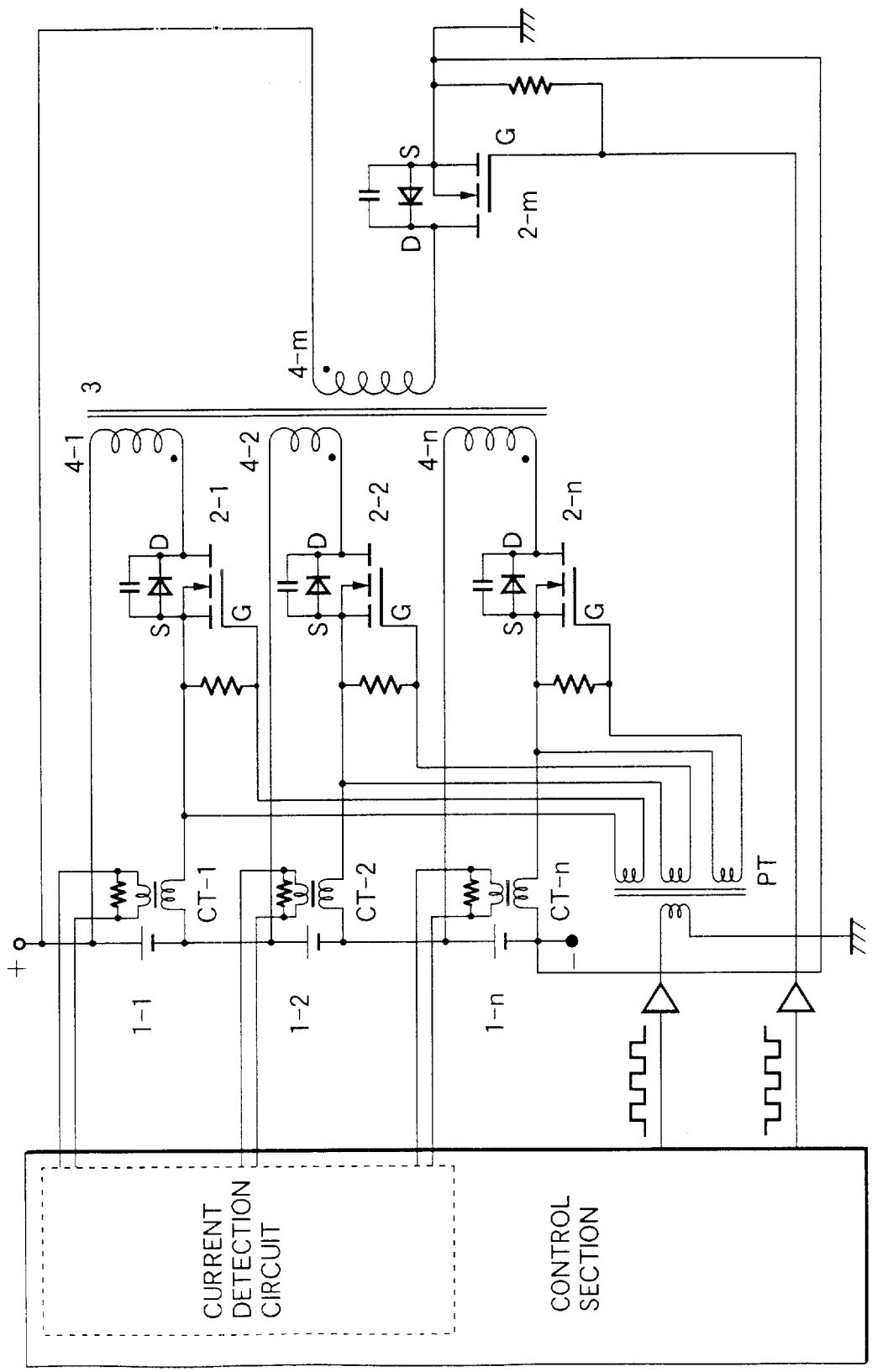
FIG. 6 is a diagram showing a circuit for detecting the timing of completion of the release of the exciting energy of a transformer.

In order to detect the completion of release of exciting energy stored in the transformer by an ON operation of the second switching device into the first battery devices through the first switching devices, a current transformer CT-1 to CT-n as a current detector is provided in each closed circuit constituted of each secondary winding 4-1 to 4-$n$, each battery device 1-1 to 1-$n$, and each switching device 2-1 to 2-$n$, as shown in FIG. 6. Then, by detecting the timing of the polarity inversion of the output of each transformer, the timing of the completion of the release of exciting energy in the transformer 3 can be detected. Here, a resistor may be used instead of each current transformer shown herein. Further, a pulse transformer PT may be used for driving the switching devices 2-1 to 2-$n$, as shown in FIG. 6.

Furthermore, the timing of the completion of the release of exciting energy in the transformer 3 can be detected by an operation on the terminal voltage of the first battery devices, exciting energy in the transformer, or the like.

Described below is a discussion that the voltage equalizing among the battery devices can be realized without an increase in apparatus size.

A current from the battery device 1-$m$ flows into the winding 4-$m$ for the ON duration of the second switching device 2-$m$, whereby an amount of energy is stored in the transformer 3 by a current portion not shaded in FIG. 2(*d*).

FIG. 2(*f*) shows the change in the voltage Vds across the switching device 2-$m$ before and after the ON transition of the switching device 2-$m$.

When the switching devices 2-1 to 2-$n$ go OFF, the electric charge stored in a capacitance component (parasitic capacitance and an external capacitor) across the switching device 2-$m$ is discharged through a parasitic diode involved in the switching device 2-$m$, whereby the voltage Vds across the switching device 2-$m$ falls to about zero (approximately equal to the normal direction voltage of the diode) for the pause duration until the ON transition of the switching device 2-$m$.

When the ON state of the switching devices 2-1 to 2-$n$ is continued after the release of exciting energy in the transformer, the direction of the current flowing each closed circuit becomes reversed, and a current begins to flow, in turn, from each switching device 2-1 to 2-$n$ to each winding 4-1 to 4-$n$ (shaded part in FIG. 2(*c*)). The reversed current excites the transformer, and transfers energy from a battery device having a higher terminal voltage to a battery device having a lower terminal voltage.

At that time, the voltage across each switching device 2-1 to 2-$n$ changes as shown in FIG. 2(*e*).

When the switching devices (FET's) 2-1 to 2-$n$ go OFF, the exciting energy stored by a portion of the reversed current is released to the primary winding. This released current draws the electric charge stored in the capacitance component (including an external capacitor) across the Vds of the switching device (FET) 2-$m$. After that, the Vds is clamped to the normal direction voltage (about 0.5 V) for the duration when a normal direction current flows in the parasitic diode of the FET.

Therefore, for the almost entire duration shown by a shadow in the waveform shown in FIG. 2(*d*), a current is flowing in the parasitic diode. Accordingly, if the switching device 2-$m$ is turned ON within the duration, the Vds is almost zero, and hence zero-volt switching can be achieved. The zero-volt switching reduces the switching power loss and the noise at switching ON.

The description above has been made for the switching device 2-$m$. However, the situation is similar also for the switching devices 2-1 to 2-$n$ (FIG. 2(*e*)).

Then, the switching device 2-$m$ goes OFF and the switching devices 2-1 to 2-$n$ go ON. In this situation, each battery device 1-1 to 1-$n$ is ready for charge by the voltage across each winding 4-1 to 4-$n$ induced by the energy stored in the transformer 3 for the ON duration of the switching device 2-$m$.

However, every battery device 1-1 to 1-$n$ is not equally charged by the induced voltage across each winding 4-1 to 4-$n$.

Figure 7:
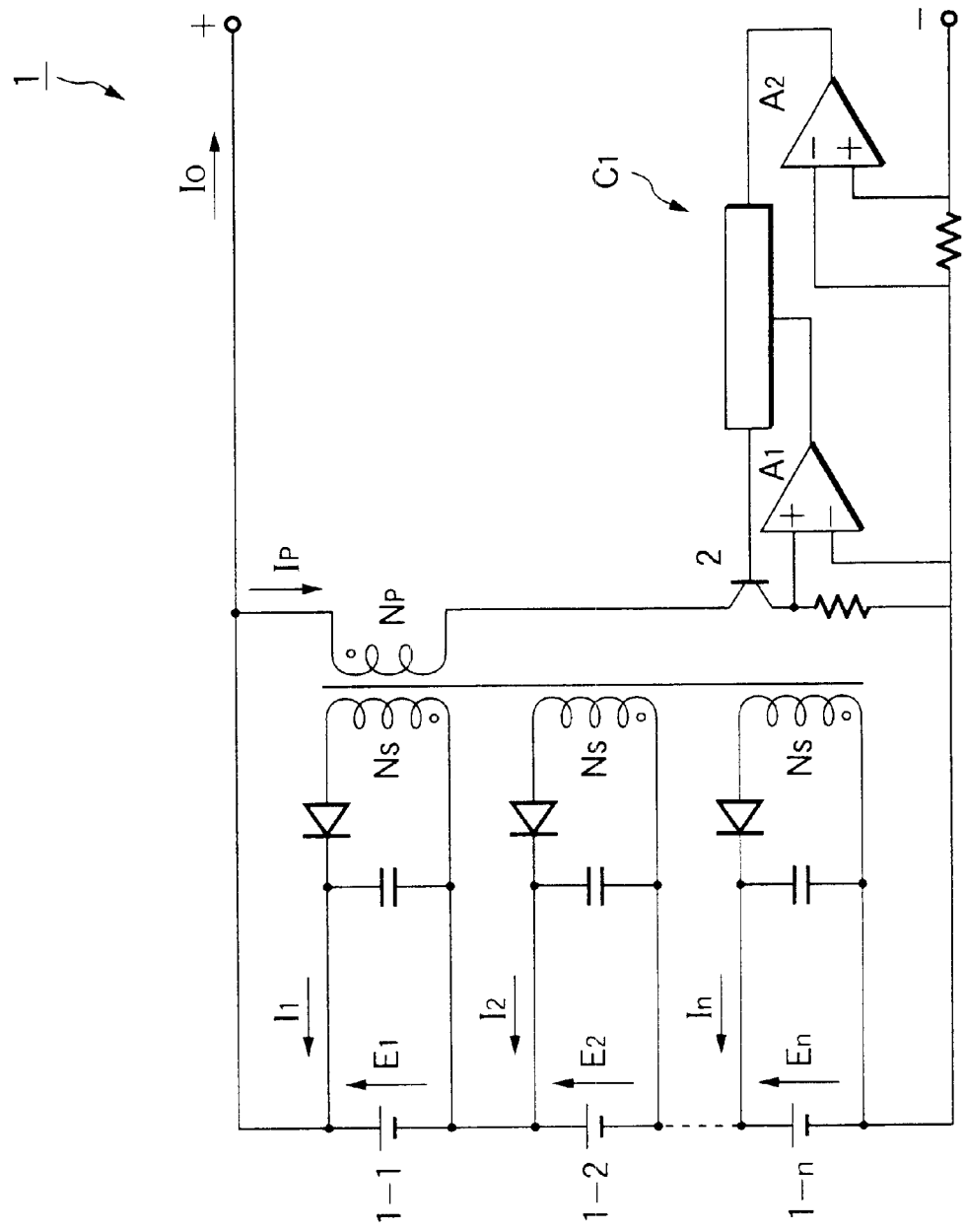
FIG. 7 is a diagram showing a voltage equalizing apparatus for battery devices in accordance with a first related art.
Figure 8:
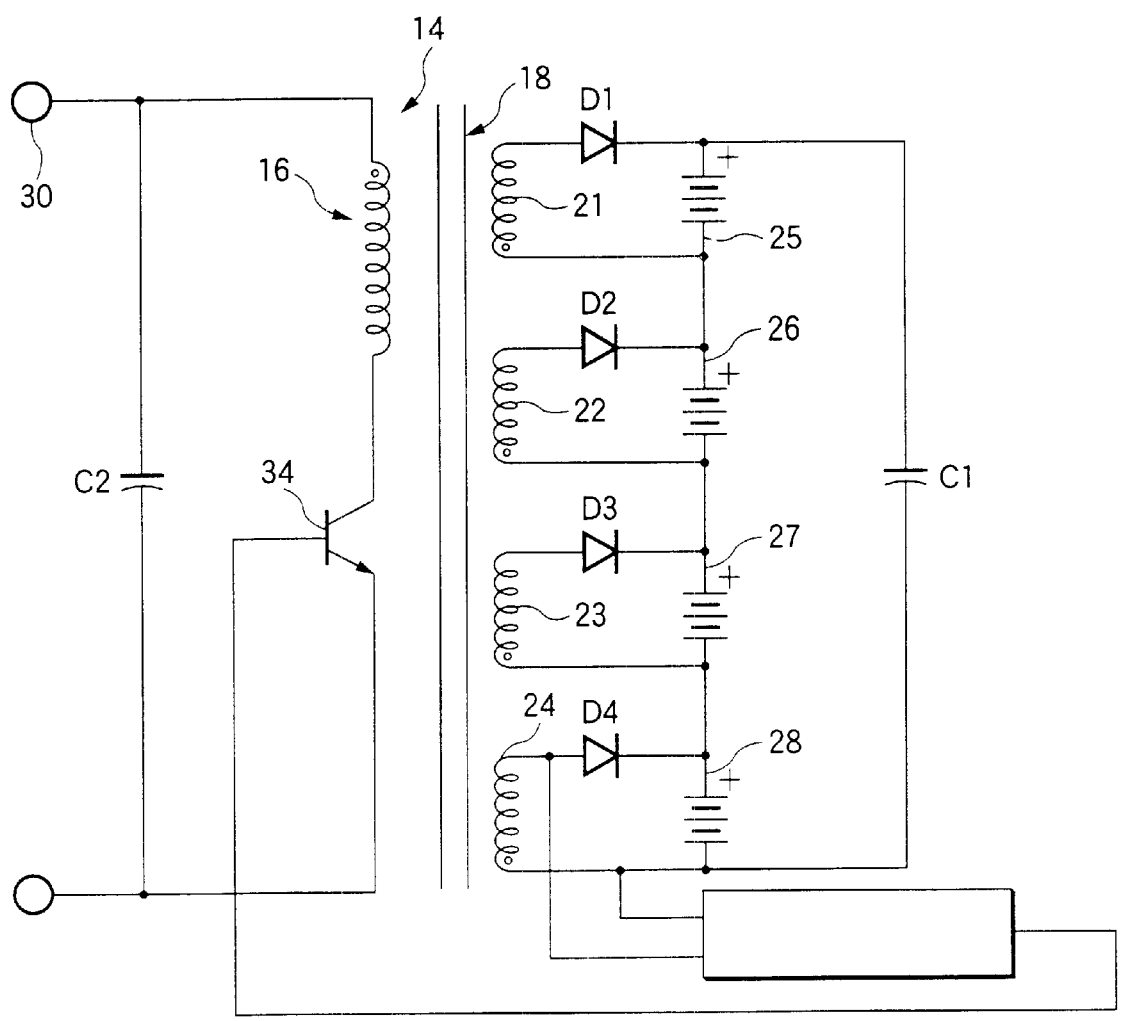
FIG. 8 is a diagram showing a voltage equalizing apparatus for battery devices in accordance with a second related art.

When there is a variation in the output voltages of the battery devices 1-1 to 1-$n$ interconnected in series, the current of the portion not shadowed in FIG. 2(*c*) concentrates in a battery device having the lowest voltage among the battery devices interconnected in series. This charging current increases the voltage of the battery device having the lowest voltage among the battery devices interconnected in series. Such an operation is repeated, thereby equalizing the voltages of the battery devices interconnected in series. (The situation is the same as that of the voltage equalizing operation by the related art circuits shown in FIGS. 6 and 7.)

As described above, in the present invention, even after the concentrated release of the energy stored in the transformer 3 for the ON duration of the switching device 2-$m$ into the battery device having the lowest voltage (after the timing indicated by a broken line X in FIG. 2), the switching devices 2-1 to 2-$n$ remain ON.

If there is a variation in the output voltages of the battery devices 1-1 to 1-$n$ interconnected in series still at the timing X of the concentrated release of the energy stored in the transformer 3 for the ON duration of the switching device 2-*m* into the battery device having the lowest voltage, discharging occurs from a battery device having the highest voltage among the battery devices interconnected in series. This is because the switching devices 2-1 to 2-*n* are ON. The discharging current is indicated by shadow portion in FIG. 2(*c*).

As such, energy stored in the transformer 3 by the current indicated by shadow portion in FIG. 2(*c*) from a battery device having the highest voltage among the battery devices interconnected in series. Further, energy is transferred from a battery device having the highest voltage to a battery device having the lowest voltage.

The energy stored in the transformer 3 is released as a charging current (shadow portion in FIG. 2(*d*)) flowing into the battery device 1-*m* after the switching devices 2-1 to 2-*n* go OFF. (For this duration, the switching device 2-*m* does not go ON yet. However, the switching device 2-*m* is provided with a diode connected in the direction permitting the battery device 1-*m*. Thus, charging is possible.)

Figure 3:
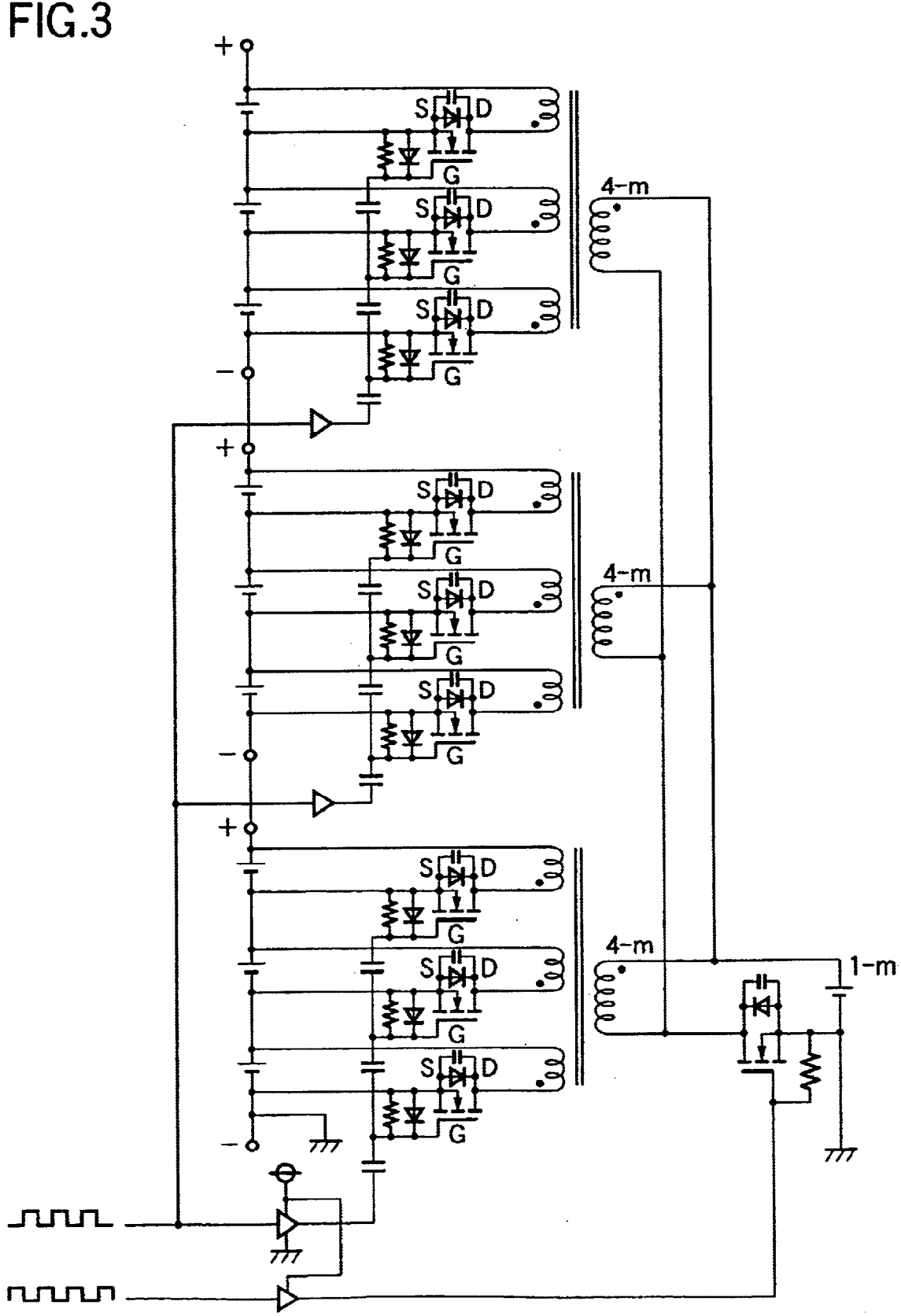
FIG. 3 is a diagram showing a voltage equalizing apparatus for battery devices in accordance with a second embodiment of the invention.

When an FET is used for the switching device as shown in FIGS. 1 and 3, the parasitic diode is generated by a fabrication process. Energy is transported through the windings 4-1 to 4-*n*, and thereby stored in the transformer 3. When the switching devices 2-1 to 2-*n* go OFF, the energy is discharged and released from the transformer 3 so as to change the second battery device 1-*m*.

As such, even when there is a variation in the output voltages of the battery devices interconnected in series, the control is carried out such that a battery device having a lower voltage is charged and that a battery device having a higher voltage is discharging. Accordingly, the equalizing of the voltages of the battery devices is enhanced in comparison with the related art.

Such equalizing operation can perform equalization to an extent (for example, 20 mV), however, the variation is not improved further.

This is because a high current is supplied (the ON duration of the second switching device and/or the first switching devices is long) in each closed circuit in order to achieve the voltage equalizing as rapid as possible in the initial state having a large unbalance.

When such a high current flows through a line resistance, the ON resistance of an FET, the resistance in a transformer winding, and the like, a voltage drop occurs and is added to the terminal voltage of each switching device. This added voltage appears across each secondary winding. Therefore, if an added voltage coincides with another added voltage, the equalizing does not proceed between these battery devices even when there is an actual voltage difference.

That is, the equalizing of the terminal voltages of the battery devices is obstructed by the "difference in generated voltage" due to a variation in line resistance, ON resistance of an FET, resistance in a transformer winding, and the like existing in each first closed circuit.

A method for resolving this problem is to reduce the circuit current during the equalizing, thereby reducing the "difference in generated voltage" (that is, to shorten the ON duration of the second switching device and/or the first switching devices).

Therefore, the method of shortening the ON duration of the second switching device and/or the first switching devices thereby to reduce the equalizing currents when the variation becomes somewhat small is effective for improving the precision of the equalizing of the terminal voltages of the battery devices.

Second Embodiment

A second embodiment of the present invention is described below with reference to FIG. 3.

In FIG. 3, the basic circuit of the present invention shown in FIG. 1 is treated as a single circuit. A plurality of such circuits (three circuits in FIG. 3) are provided, and a plurality of battery devices in respective circuits are interconnected in series. However, a battery device 1-*m* and a pulse supplying circuit for switching ON and OFF each switching device are used in common.

Figure 4:
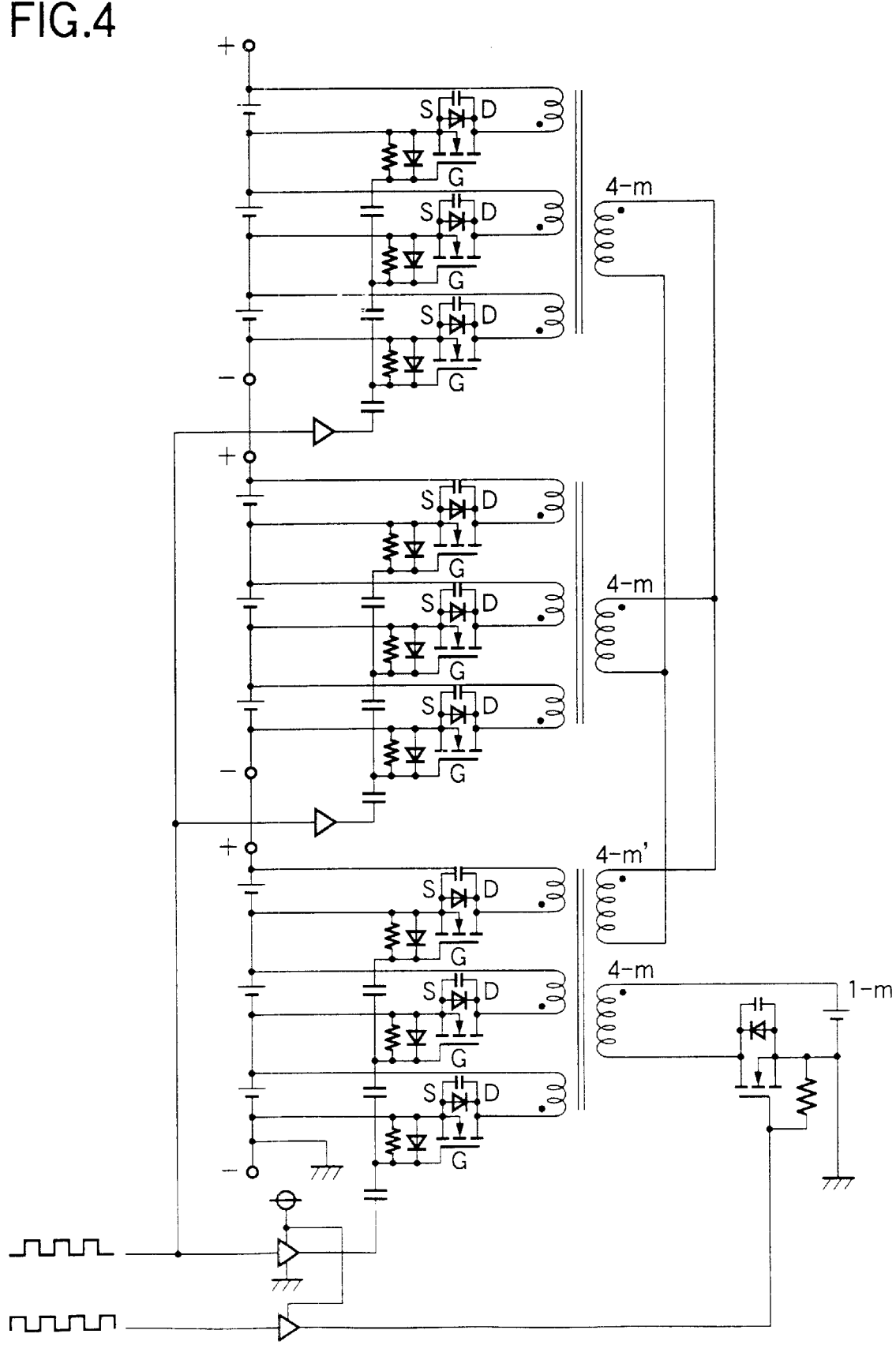
FIG. 4 is a diagram showing a voltage equalizing apparatus for battery devices in accordance with a modification of the second embodiment of the invention.

Further, in FIG. 3, a circuit equalizing winding 4-*m* is common with an exciting winding from a battery device 1-*m*. However, the exciting winding and the circuit equalizing winding may be separate as shown in FIG. 4.

The operation of the second embodiment is basically the same as that of the first embodiment. However, voltage equalizing occurs also among the circuits similarly to that within a single circuit, whereby overall voltage equalizing is achieved.

This configuration has a further effect that a required output voltage can be obtained by an appropriate combination of a plurality of single circuits.

Figure 5:
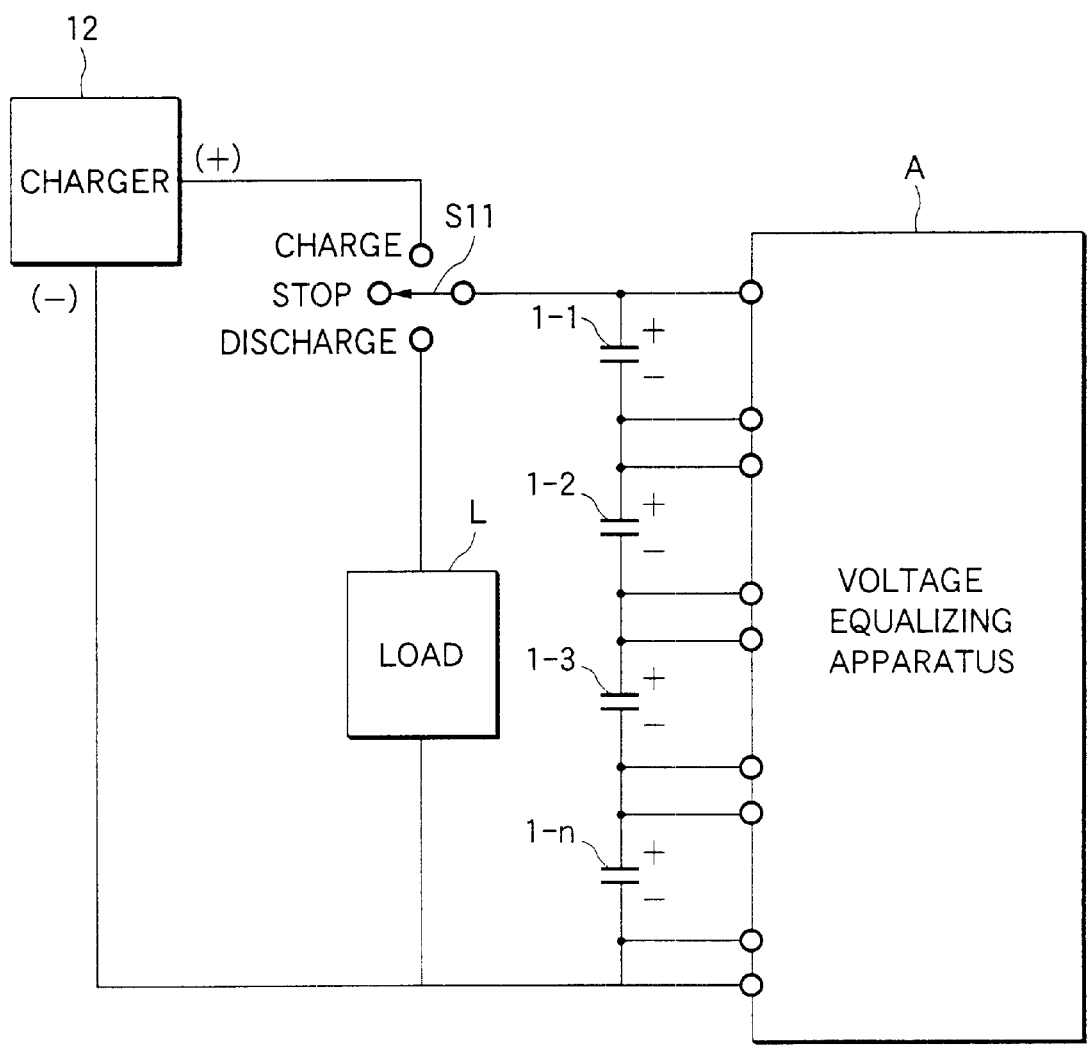
FIG. 5 is a diagram showing the relation between a voltage equalizing apparatus for battery devices and both an external power supply and a load.

FIG. 5 shows the usage of a voltage equalizing apparatus for battery devices in accordance with the present invention. In FIG. 5, Numerals 1-1 to 1-*n* are plurality of battery devices interconnected in series. Numeral A is a voltage equalizing apparatus. Numeral 12 is an external charger. Numeral L is a load. Numeral S11 is a switch.

In case that a plurality of battery devices interconnected in series are used as a driving cell for an electric car, the load is an electric motor for driving the car. With the switch S11 setting to charging mode, the charger performs charging by using electric power generated by a generator during the running of the car by gasoline motor. During the running by driving cell, the switch S11 is set to discharging mode to drive the electric motor.

As such, when a voltage equalizing apparatus (method) for battery devices in accordance with the present invention is applied to a hybrid car using the combination of a gasoline motor and an electric motor and an electric car using an electric motor alone, the output voltages are equalized among a plurality of battery devices interconnected in series necessary for driving the electric motor for running, whereby the output power of the cell is used efficiently. Therefore, the emission of carbon dioxide and the like is reduced, which contributes to the protection of global environment.

During the charge from the charger and the discharge to the load by the battery devices interconnected in series, a large current flows in each of the battery devices interconnected in series. The large current causes a large voltage drop across the internal resistance of each battery device, thereby affecting the voltage detection of each battery device. Therefor, the voltage equalizing operation by the voltage equalizing apparatus is preferably stopped for such duration.

In FIGS. 1 and 3, a switching device of FET is used. However, a switching device of the present invention is not restricted to an FET. That is, another switching device, such as a transistor and a thyristor, may be used. When a transistor and the like is used, a diode for flowing a current in the reverse direction for the OFF duration of the switching device is preferably connected in parallel.

A battery device may by a battery cell, such as a lead-acid battery, a nickel-hydrogen cell, a lithium ion cell, and a polymer lithium cell. Further, a battery device may be an electrical double layer capacitor. The type of each battery device 1-1 to 1-$n$ interconnected in series may be the same as or different from that of the battery device 1-$m$.

A plurality of battery devices 1-1 to 1-$n$ interconnected in series may be used also as a second battery device as shown in FIG. 6.

Third Embodiment

Figure 9:
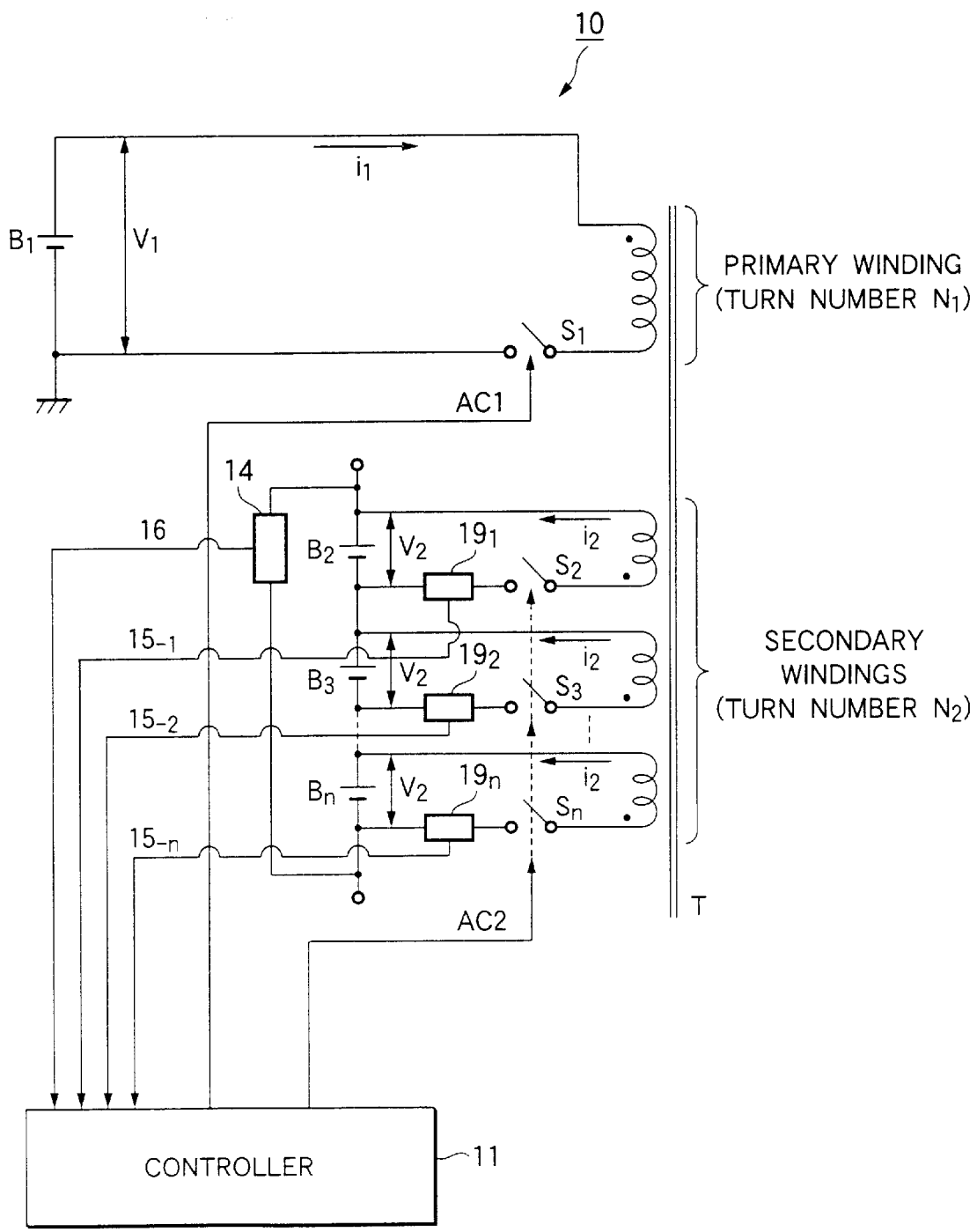
FIG. 9 is a circuit diagram showing the fundamental configuration of a voltage equalizing apparatus for battery devices in accordance with a third embodiment of the invention.

A third embodiment is described below. FIG. 9 is a circuit diagram showing the fundamental configuration of a voltage equalizing apparatus according to the third embodiment.

As shown in FIG. 9, the voltage equalizing apparatus 10 comprises a plurality of first battery devices B2 to Bn interconnected in series. A closed circuit is formed by each of the first battery devices B2 to Bn, each of a plurality of secondary windings (with turn number $N_2$) magnetically interconnected with each other through a transformer T, and each of a plurality of first switching devices S2 to Sn.

In addition to the first battery devices B2 to Bn, a second battery device B1 is provided. The second battery device B1 may be used in common with a DC power supply, a charger, or a generator. A closed circuit is formed by the second battery device B1, a primary winding (with turn number $N_1$) magnetically interconnected with the secondary windings in common, and a second switching device S1.

The activation of the second switching device S1 is controlled by a control signal AC1, while the activation of the first switching devices S2 to Sn is controlled simultaneously by a control signal AC2.

The control signal AC1 and the control signal AC2 are transmitted from a a controller 11. The control signal AC1 and the control signal AC2 control the activation so that when the second switching device S1 is ON, the first switching devices S2 to Sn are OFF, and that when the first switching devices S2 to Sn are ON, the second switching device S1 is OFF. Accordingly, the activation is controlled so that the first switching devices and the second switching device are alternately turned ON and OFF, whereby energy is transported from the second battery device B1 to each of the first battery devices B2 to Bn.

Since the secondary windings are connected to a common core, a charging current flows through a battery device having the lowest voltage among the first battery devices B2 to Bn. As a result, the voltages of the first battery devices B2 to Bn are equalized.

Alternatively, each of a current detector 19-1 to 19-$n$ may be provided in each closed circuit composed of one of the secondary windings, one of the first switching devices S2 to Sn, and one of the first battery devices B2 to Bn. By virtue of this, the current flowing through each closed circuit is detected. Current signals 15-1 to 15-$n$ detected by the current detector 19-1 to 19-$n$ are transmitted to the controller 11. For example, in case that a current transformer is used as each a current detector 19-1 to 19-$n$, and that the timing of the polarity inversion of the output of each transformer is detected, the time of completion of the release of the exciting energy of the transformer T is detected. This gives the time of completion of the transportation of a predetermined amount of energy, which is described later in the control method of the voltage equalizing apparatus.

Further, a voltage detector 14 may be provided, for example, between the positive terminal of the first battery device B2 and the negative terminal of the first battery device Bn. The detected voltage signal 16 is transmitted to the controller 11.

In case that a duration when the second switching device S1 and the first switching devices S2 to Sn are OFF simultaneously is provided in the duration between the switching-OFF of the second switching device S1 and the switching-ON of the first switching devices S2 to Sn and in the duration between the switching-OFF of the first switching devices S2 to Sn and the switching-ON of the second switching device S1, the zero-volt switching is achieved in which the second switching device S1 or the first switching devices S2 to Sn are turned ON in the situation that no charge exists in the capacitance components across these switching devices.

Described below is the situation in which the voltages of the first battery devices B2 to Bn are equalized in the circuit shown in FIG. 9.

Figure 10:
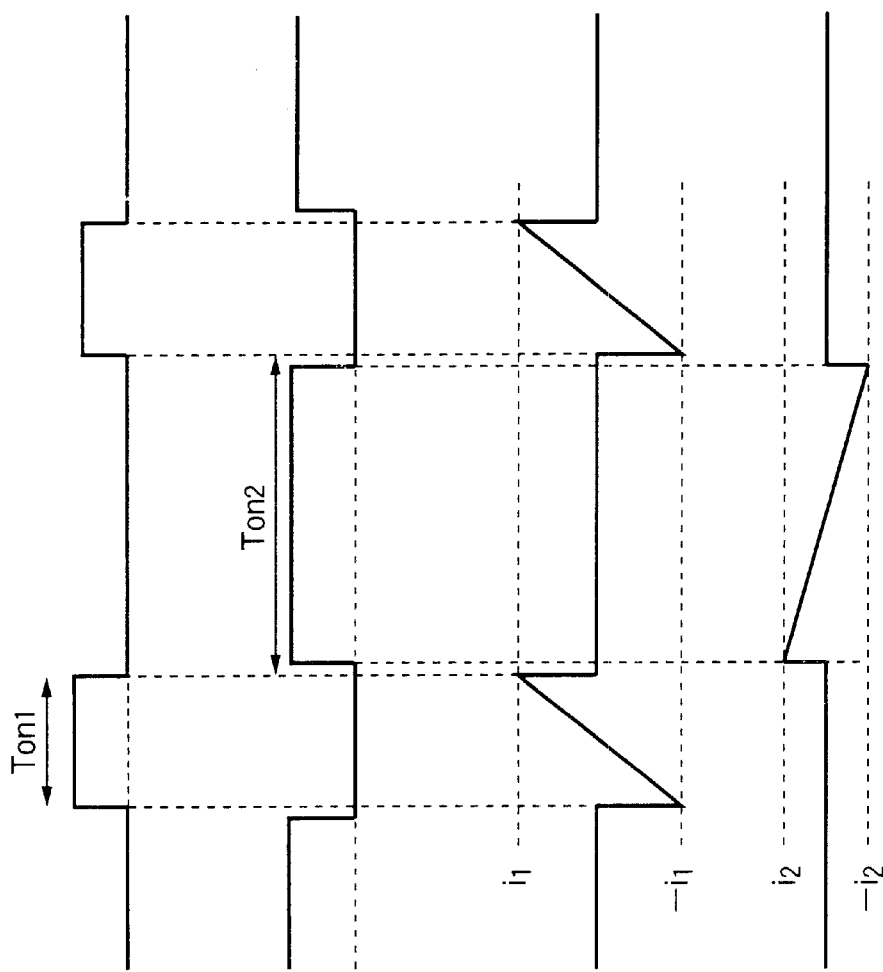
FIGS. 10A(a) to 10(d) are timing charts in the situation in which the first battery devices B2 to Bn have been equalized.
FIG. 10(b) shows S2 to Sn.
FIG. 10(c) shows the charging and discharging current of B1.
FIG. 10(d) shows the charging and discharging current of B2 to Bn, respectively.

Here, $V_2$ denotes the voltage of each of the first battery devices B2 to Bn, while $i_2$ denotes the charging and discharging current. $T_{ON1}$ denotes the ON duration of the second switching device S1, while $T_{ON2}$ denotes the ON duration of the first switching devices S2 to Sn. $V_1$ denotes the voltage of the second battery device B1, while $i_1$ denotes the charging and discharging current. FIG. 10 is a timing diagram showing the relation between these quantities.

In the circuit shown in FIG. 9, since the turn number of the primary winding is $N_1$, and since the turn number of the secondary winding is $N_2$, the relation shown by the following Eq. (1) holds.

$$N_1 i_1 = n N_2 i_2 \tag{1}$$

According to Eq. (1), the charging and discharging current $i_2$ to the first battery devices B2 to Bn is expressed by the following Eq. (2).

$$i2 = N1 i1 / n N_2 \tag{2}$$

From the ON duration $T_{ON1}$ of the second switching device S1, the charging and discharging current $i_1$ from the second battery device B1, and the inductance $L_1$ of the primary winding, the voltage $V_1$ of the second battery device B1 is expressed by the following Eq. (3).

$$V_1 = 2 \times i_1 L_1 / T_{ON1} \tag{3}$$

Similarly, from the ON duration $T_{ON2}$ of the first switching device S2, the charging and discharging current $i_2$ from the first battery devices B2 to Bn, and the inductance $L_2$ of a single secondary winding, the equalized voltage $V_2$ of the first battery devices B2 to Bn is expressed by the following Eq. (4).

$$V_2 = 2 n \times i_2 L_2 / T_{ON2} \tag{4}$$

Substituting Eq. (2) into Eq. (4), the following Eq. (5) is obtained.

$$V_2 = 2 \times (N_1/N_2) i_1 L_2 / T_{ON2} \tag{5}$$

From Eqs. (3) and (5), the ratio $V_1/V_2$ is expressed by the following Eq. (6).

$$V_1/V_2 = (L_1/L_2) \times (N_2/N_1) \times (T_{ON2}/T_{ON1}) \tag{6}$$

Since the relation between the inductance and the turn number is expressed by $L_1/L_2 = N_1^2/N_2^2$, the ratio $V_1/V_2$ is expressed by the following Eq. (7).

$$V_1V_2 = (N_1^2/N_2^2) \times (N_2/N_1) \times (T_{ON2}/T_{ON1}) \quad (7)$$
$$= (N_1/N_2) \times (T_{ON2}/T_{ON1})$$

As seen from Eq. (7), the $V_1/V_2$ between the voltage $V_1$ of the second battery device B1 and the equalized voltage $V_2$ of the first battery devices B2 to Bn is determined by setting the ON-duration ratio $T_{ON2}/T_{ON1}$ between the ON duration $T_{ON2}$ of the first switching devices S2 to Sn and the ON duration $T_{ON1}$ of the second switching device S1.

In a method of controlling a voltage equalizing apparatus according to the third embodiment, when the voltage of the second battery device B1 as the source of energy transportation or reception is $V_1$, in order to set the voltages of the first battery devices B2 to Bn to be a predetermined voltage $V_2$, the ON-duration ratio $T_{ON2}/T_{ON1}$ is set to a value calculated from the relation of Eq. (7), whereby the controller 11 outputs an control signal AC1 and an control signal AC2, thereby controlling the activation of the second switching device S1 and the first switching devices S2 to Sn.

Further, a method of controlling a voltage equalizing apparatus according to the third embodiment may be implemented in the following control method.

First, the ON-duration ratio $T_{ON2}/T_{ON1}$ is set to a value causing the voltages of the first battery devices to exceed $V_2$, and then energy transportation is carried out immediately before the voltages of the first battery devices actually exceed $V_2$.

The monitoring of the voltages can be carried out, for example, by the controller 11 monitoring the voltage obtained from the voltage detector 14.

Next, the controller 11 resets the ON-duration ratio $T_{ON2}/T_{ON1}$ to a value causing the voltages to be $V_2$, and then energy transportation is carried out until the voltages becomes $V_2$, whereby the voltages of the first battery devices are finally set to $V_2$.

By virtue of this, the voltages of the first battery devices B2 to Bn are set to a desired voltage in a shorter time.

Furthermore, a method of controlling a voltage equalizing apparatus according to the third embodiment may be implemented in the following control method.

Here, frequency f is defined as the reciprocal of the sum of the ON duration $T_{ON1}$ of the second switching device and the ON duration $T_{ON2}$ of the first switching devices, as shown by the following Eq. (8). Here, the duration when the second switching device and the first switching devices are OFF simultaneously is generally very short and hence neglected.

$$f=1/(T_{ON1}+T_{ON2}) \quad (8)$$

With maintaining the ON-duration ratio $T_{ON2}/T_{ON1}$, the frequency f is set to a low frequency (a frequency lower than that in the stationary state), and then energy transportation is carried out.

This reduces the time necessary for the energy transportation from the second battery device B1 to each of the first battery devices B2 to Bn and vice versa.

Further, a method of controlling a voltage equalizing apparatus according to the third embodiment may be implemented in the following control method.

When the transportation of a predetermined amount of energy from the second battery device B1 to the first battery devices B2 to Bn and vice versa is completed and when the voltages of the first battery devices have been approximately equalized, the frequency f shown by Eq. (8) is set to a high frequency (a frequency higher than that in the stationary state).

When the frequency f shown by Eq. (8) is set to a high frequency (a frequency higher than that in the stationary state) as described above, the amount of circulation energy after the completion of equalization is reduced, whereby the energy loss in the voltage equalizing apparatus is reduced.

Further, a method of controlling a voltage equalizing apparatus according to the third embodiment may be implemented in the following control method.

When the transportation of a predetermined amount of energy from the second battery device B1 to the first battery devices B2 to Bn and vice versa is completed and when the voltages of the first battery devices B2 to Bn have been approximately equalized, the second switching device S1 and the first switching device S2 are turned OFF simultaneously. This reduces the energy loss in the voltage equalizing apparatus.

When the voltage balance becomes poor, in order to avoid this, the second switching device S1 and the first switching device S2 are turned ON and OFF repeatedly again.

Fourth Embodiment

Figure 11:
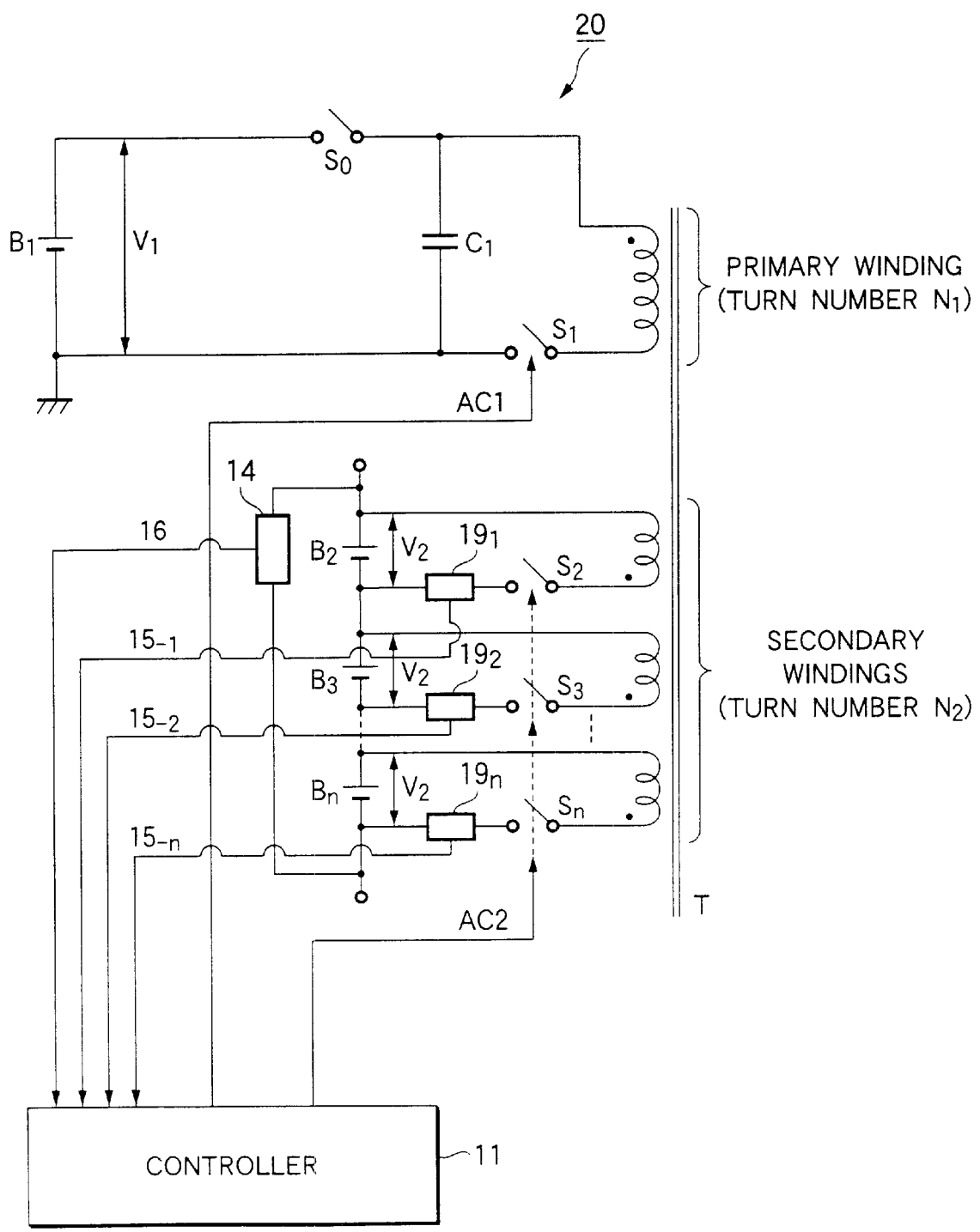
FIG. 11 is a circuit diagram showing the fundamental configuration of a voltage equalizing apparatus for battery devices in accordance with a fourth embodiment of the invention.

A fourth embodiment is described below. FIG. 11 is a circuit diagram showing the fundamental configuration of a voltage equalizing apparatus according to the fourth embodiment.

As shown in FIG. 11, in addition to the configuration of the voltage equalizing apparatus 10 according to the third embodiment, the voltage equalizing apparatus 20 comprises: a third switching device S0 between the positive terminal of a second battery device B1 and a primary winding; and a third battery device C1 between the primary-side terminal of the third switching device S0 and the negative terminal of the second battery device B1.

The position of the third switching device S0 may be between the negative terminal of the second battery device B1 and the second switching device S1.

The third battery device C1 is preferably a battery device having a capacity smaller than that of the second battery device B1.

Described below is a method of controlling a voltage equalizing apparatus according to the fourth embodiment.

In a method of controlling a voltage equalizing apparatus according to the third embodiment, the method of controlling a voltage equalizing apparatus according to the third embodiment is carried out until the transportation of a predetermined amount of energy from the second battery device B1 to the first battery devices B2 to Bn and vice versa is completed. After that, the third switching device S0 is turned OFF.

Then, the ON/OFF operation of the second switching device S1 and the first switching device S2 is continued, whereby the equalization of the voltages of the first battery devices B2 to Bn is maintained.

When almost all of the energy to be transported has been completed, equalization is carried out efficiently in case that only a small amount of energy is transported between the primary winding and the secondary windings. Accordingly, the loss until the equalization of the voltages of the first battery devices B2 to Bn is reduced when the third switching device S0 is turned OFF and when the third battery device C1 having an energy capacity smaller than that of the second battery device B1 is used for equalization.

Fifth Embodiment

Figure 12:
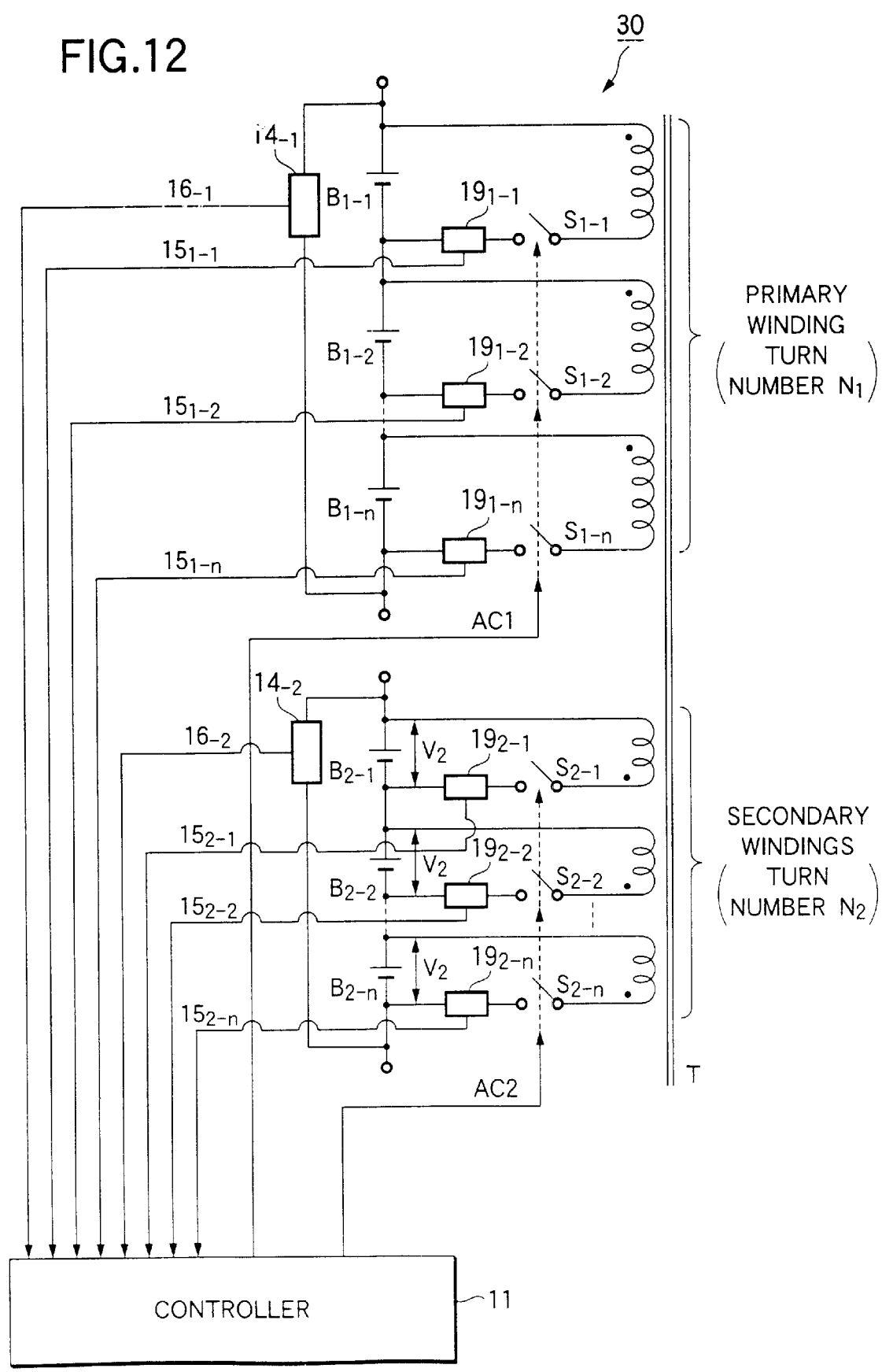
FIG. 12 is a circuit diagram showing the fundamental configuration of a voltage equalizing apparatus for battery devices in accordance with a fifth embodiment of the invention.

A fifth embodiment is described below. FIG. 12 is a circuit diagram showing the fundamental configuration of a voltage equalizing apparatus according to the fifth embodiment.

As shown in FIG. 12, the voltage equalizing apparatus 30 comprises a plurality of first battery devices B2-1 to B2-n interconnected in series. A closed circuit is formed by each of the first battery devices B2-1 to B2-n, each of a plurality of secondary windings (with turn number $N_2$) magnetically interconnected with each other through a transformer T, and each of a plurality of first switching devices S2-1 to S2-n.

In addition to the first battery devices B2-1 to B2-n, a plurality of second battery devices B1-1 to B1-n are provided. A closed circuit is formed by each of the second battery devices B1-1 to B1-n, each of the a plurality of primary windings (with turn number $N_1$) magnetically interconnected with the secondary windings in common, and each of a plurality of second switching devices S1-1 to S1-n.

The activation of the second switching devices S1-1 to S1-n is controlled simultaneously by a control signal AC1, while the activation of the first switching devices S2-1 to S2-n is controlled simultaneously by a control signal AC2.

The control signal AC1 and the control signal AC2 are transmitted from a a controller 11. The control signal AC1 and the control signal AC2 control the activation so that when the second switching devices S1-1 to S1-n are ON, the first switching devices S2-1 to S2-n are OFF, and that when the first switching devices S2-1 to S2-n are ON, the second switching devices S1-1 to S1-n are OFF. Accordingly, the activation is controlled so that the first switching devices and the second switching devices are alternately turned ON and OFF, whereby energy is transported between each of the second battery devices B1-1 to B1-n and each of the first battery devices B2-1 to B2-n.

Since the primary windings and the secondary windings are connected to a common core, a charging current flows through a battery device having the lowest voltage among the second battery devices B1-1 to B1-n and the first battery devices B2-1 to B2-n. As a result, the voltages of the second battery devices B1-1 to B1-n or the first battery devices B2-1 to B2-n are equalized.

Alternatively, each of a current detector 191-1 to 191-n may be provided in each closed circuit composed of one of the primary windings, one of the second switching devices S1-1 to S1-n, and one of the second battery devices B1-1 to B1-n. Further, each of a current detector 192-1 to 192-n may be provided in each closed circuit composed of one of the secondary windings, one of the first switching devices S2-1 to S2-n, and one of the first battery devices B2-1 to B2-n. By virtue of this, the current flowing through each closed circuit is detected. Current signals 151-1 to 151-n and 152-1 to 152-n detected by the current detector 191-1 to 191-n and 192-1 to 192-n are transmitted to the controller 11.

Further, a voltage detector 14-1 may be provided, for example, between the positive terminal of the second battery device B1-1 and the negative terminal of the second battery device B1-n, while a voltage detector 14-2 may be provided between the positive terminal of the first battery device B2-1 and the negative terminal of the first battery device B2-n. The detected voltage signal 16-1 and 16-2 are transmitted to the controller 11.

As such, in the fifth embodiment, used are a plurality of second battery devices each of which is similar to that in the third embodiment. Accordingly, in addition to the effect of the third embodiment, the voltages of the second battery devices B1-1 to B1-n are also equalized.

In the fifth embodiment, since the second switching devices S1-1 to S1-n are controlled by a common control signal AC1, relations similar to Eqs. (1) to (8) are obtained. Accordingly, the voltage equalizing apparatus is controlled by a control method according to the third embodiment.

The previous explanations have been described mainly for the case of energy transportation from the second battery device to the first battery devices. However, a feature of the fifth embodiment is that the backward energy transportation from the first battery devices to the second battery devices is also available.

According to the invention, a voltage equalizing apparatus for battery devices comprises:

a core;

a plurality of first closed circuits each composed of one of a plurality of first battery devices (1-1 to 1-n) interconnected in series, one of a plurality of secondary windings (4-1 to 4-n) magnetically connected with each other through the core (3), and one of a plurality of first switching devices (2-1 to 2-n); and a second closed circuit composed of a second battery device (1-m), a primary winding (4-m) magnetically connected with the secondary windings through the core, and a second switching device (2-m);

wherein the first switching devices and the second switching device are alternately turned ON and OFF to equalize the output voltages of the first battery devices;

when the second switching device is turned ON, exciting energy stored in the core is transported to the first battery devices through the first switching devices; and the first switching devices continue to be turned ON after the transportation of the exciting energy is completed.

By virtue of this, voltage equalization is carried out more efficiently than a related art circuit.

In accordance with the invention, when the second switching device is turned ON, exciting energy stored in the core is transported to the first battery devices through the first switching devices, and the first switching devices continue to be turned ON after the transportation of the exciting energy is completed.

By virtue of this, the similar effect is obtained.

In accordance with the invention, a detector for detecting the variation in the output voltages of the first battery devices (1-1 to 1-n) is provided, whereby in case of a large variation, the ON duration of the second switching device (2-m) and/or the first switching devices (2-1 to 2-n) is extended. By virtue of this, voltage equalization is speeded up.

In accordance with the invention, in case of a small variation in the output voltages of the first battery devices, the ON/OFF operation of the first switching devices and the second switching device is stopped, and/or the ON duration of the first switching devices and the second switching device is extremely shortened. This avoids power loss and noise due to unnecessary voltage equalizing operation in case of the small variation in the output voltages.

In accordance with the invention, in case that the variation in the output voltages of the first battery devices becomes smaller than a predetermined value, the ON duration of the first switching devices and/or the second switching device is shortened for the reduction of power consumption for the equalizing. By virtue of this, current consumption for the equalizing is reduced after the equalizing has been achieved to an extent (for example, 20 mV), whereby the precision increases in equalizing the terminal voltages of the battery devices.

In accordance with the invention, in case that current greater than or equal to a predetermined value flows through the first battery devices, the ON/OFF operation of the first switching devices and the second switching device is stopped, and/or the ON duration of the first switching devices and the second switching device is extremely shortened. By virtue of this, the voltage equalizing operation is substantially stopped when the cell voltage detection of each battery device is affected by a voltage drop generated across the internal resistance of the battery device by a high current flowing through the first battery devices. This avoids the problem caused by the large current following the battery devices.

In accordance with the invention, during the charge from an external power supply and the discharge to an external load by the first battery devices, the ON/OFF operation of the first switching devices and the second switching device is stopped, and/or the ON duration of the first switching devices and the second switching device is extremely shortened. By virtue of this, the voltage equalizing operation is stopped, even without current detection, automatically in response to the operation of a switch (S11) for switching the charge and discharge modes.

In accordance with the invention, when the first switching devices and the second switching device are alternately turned ON and OFF, there is a pause in an interval from the switching-OFF of the first switching devices to the switching-ON of the second switching device and in an interval from the switching-OFF of the second switching device to the switching-ON of the first switching devices. By virtue of this, each switching device can be turned ON under the condition of substantially no electric charge in the capacitance component between the terminals of the switching device in question (zero-volt switching). Accordingly, when the switching devices are turned ON and OFF for the voltage equalization, the problem of power loss caused by the discharge of the electric charge accumulated in the OFF duration of the switching devices into the capacitance across the terminals of the switching device is avoided. Further, the problem of noise caused by the discharge current is avoided.

According to the invention, an apparatus for equalizing circuit voltages comprises:

a plurality of circuits, wherein in each circuit, each of a plurality of closed circuits is constituted of each of a plurality of first battery devices interconnected in series, each of a plurality of secondary windings magnetically coupled with each other, and each of a plurality of first switching devices, and wherein each circuit comprises a transformer having at least a circuit equalizing winding magnetically coupled with the secondary windings in common;

wherein the circuit equalizing windings each provided in each circuit are interconnected in parallel, wherein at least one of the circuits is provided with an exciting winding magnetically coupled with the secondary windings involved in the circuit in question, wherein a closed circuit is constituted by the serial connection of the exciting winding, a second battery device, and a second switching device, and wherein when the second switching device is turned ON, exciting energy stored in the core is transported to the first battery devices through the first switching devices, and the first switching devices continue to be turned ON after the transportation of the exciting energy is completed.

By virtue of this, an effect similar to the voltage equalization in a single circuit is carried out among the circuits, whereby overall voltage equalization is achieved.

Accordingly, there is a further effect that a necessary output voltage can be obtained by an appropriate combination of single circuits.

In accordance with the invention, when the first switching device is turned ON, exciting energy stored in the core is transported to the second switching device through the second switching device, and the second switching device continues to be turned ON after the transportation of the exciting energy is completed.

By virtue of this, the similar effect is obtained.

In accordance with the invention, the combined use of the exciting winding and the circuit equalizing winding permits a miniaturization of the apparatus.

According to the invention, a voltage equalizing apparatus for battery devices comprises:

a core;

a plurality of first closed circuits each composed of one of a plurality of first battery devices interconnected in series, one of a plurality of secondary windings magnetically connected with each other through the core, and one of a plurality of first switching devices;

a second closed circuit composed of a second battery device, a primary winding magnetically connected with the secondary windings through the core, and a second switching device; and a controller for outputting a control signal for causing the second switching device and the first switching devices to be alternately turned ON and OFF, thereby causing the energy transportation between the second battery device and each of the first battery devices, and thereby equalizing the voltages of the first battery devices;

wherein the controller sets the ON-duration ratio between the ON duration of the second switching device and the ON duration of the first switching devices so that the voltages of the first battery devices become a predetermined voltage.

By virtue of this, voltage equalization of the first battery devices is carried out and a predetermined voltage is obtained.

According to the invention, a voltage equalizing apparatus for battery devices comprises:

a core;

a plurality of first closed circuits each composed of one of a plurality of first battery devices interconnected in series, one of a plurality of secondary windings magnetically connected with each other through the core, and one of a plurality of first switching devices;

a second closed circuit composed of a second battery device, a primary winding magnetically connected with the secondary windings through the core, and a second switching device; and a controller for outputting a control signal for causing the second switching device and the first switching devices to be alternately turned ON and OFF, thereby causing the energy transportation between the second battery device and each of the first battery devices, and thereby equalizing the voltages of the first battery devices;

wherein the controller sets the ON-duration ratio between the ON duration of the second switching device and the ON duration of the first switching devices so that the voltages of the first battery devices exceed a predetermined voltage, and wherein before the voltages of the first battery devices exceed the predetermined voltage, the controller resets the ON-duration ratio so that the voltages of the first battery devices become the predetermined voltage.

By virtue of this, the time necessary for the energy transportation from the second battery device to each of the first battery devices is further reduced.

In accordance with the invention, the controller sets the frequency which is the reciprocal of the sum duration of the ON duration of the second switching device and the ON duration of the first switching devices, to be a frequency lower than a normal value, thereby increasing the amount of energy transported between the second battery device and each of the first battery device in a unit time so that the voltages of the first battery devices become the predetermined voltage in a short time. By virtue of this, the voltages of the first battery devices are set to the predetermined voltage in a shorter time.

In accordance with the invention, when the transportation of a predetermined amount of energy between the second battery device and each of the first battery devices is completed and when the voltages of the first battery devices have become approximately the predetermined voltage, the controller sets the frequency which is the reciprocal of the sum duration of the ON duration of the second switching device and the ON duration of the first switching devices, to be a frequency higher than the normal value. This permits reduction of the circulation energy after the equalization is completed, and hence the energy loss is reduced.

In accordance with the invention, when the transportation of a predetermined amount of energy between the second battery device and each of the first battery devices is completed and when the voltages of the first battery devices have become approximately the predetermined voltage, the controller turns OFF the second switching device and the first switching devices. This permits reduction of energy loss.

In accordance with the invention, a third switching device and a third battery device are further provided in the second closed circuit composed of, the second battery device, the primary winding, and the second switching device, a closed circuit is formed by the second battery device, the third switching device, and the third battery device, a closed circuit is formed by the primary winding, the second switching device, and the third battery device, and when the transportation of a predetermined amount of energy between the second battery device and each of the first battery devices is completed, the controller turns OFF the third switching device and causes the second switching device and the first switching devices to continue, thereby causing the equalization of the voltages of the first battery devices to continue.

When almost all of the energy to be transported has been completed, equalization is carried out efficiently in case that only a small amount of energy is transported between the primary winding and the secondary windings. Accordingly, energy loss is reduced when the third switching device is turned OFF and when the third battery device having an energy capacity smaller than that of the second battery device is used for equalization.

According to the invention, a voltage equalizing apparatus for battery devices comprises:

a core;

a plurality of first closed circuits each composed of one of a plurality of first battery devices interconnected in series, one of a plurality of secondary windings magnetically connected with each other through the core, and one of a plurality of first switching devices;

a plurality of second closed circuits each composed of one of a plurality of second battery devices interconnected in series, one of a plurality of primary windings magnetically connected with the secondary windings through the core, and one of a plurality of second switching devices; and a controller for outputting a control signal for causing the second switching devices and the first switching devices to be alternately turned ON and OFF, thereby causing the energy transportation between each of the second battery devices and each of the first battery devices, and thereby equalizing the voltages of the second battery devices and/or the first battery devices;

wherein the controller sets the ON-duration ratio between the ON duration of the second switching devices and the ON duration of the first switching devices so that the voltages of the second battery devices or the first battery devices become a predetermined voltage.

This permits the two-directional energy transportation and the voltage equalization between each of the second battery devices and each of the first battery devices. This control method further permits a small voltage equalizing apparatus of low noise. Further, when the ON duration is set as described above and the activation of the second switching devices and the first switching devices is controlled, the voltages of the second battery devices and the first battery devices can be set to a predetermined value. Accordingly, equalization is achieved, and a predetermined voltage is obtained.

According to the invention, a voltage equalizing apparatus for battery devices comprises:

a core;

a plurality of first closed circuits each composed of one of a plurality of first battery devices interconnected in series, one of a plurality of secondary windings magnetically connected with each other through the core, and one of a plurality of first switching devices;

a plurality of second closed circuits each composed of one of a plurality of second battery devices interconnected in series, one of a plurality of primary windings magnetically connected with the secondary windings through the core, and one of a plurality of second switching devices; and a controller for outputting a control signal for causing the second switching devices and the first switching devices to be alternately turned ON and OFF, thereby causing the energy transportation between each of the second battery devices and each of the first battery devices, and thereby equalizing the voltages of the second battery devices and/or the first battery devices;

wherein the controller sets the ON-duration ratio between the ON duration of the second switching devices and the ON duration of the first switching devices so that the voltages of the second battery devices or the first battery devices exceed a predetermined voltage, and wherein before the voltages of the second battery devices or the first battery devices exceed the predetermined voltage, the controller resets the ON-duration ratio so that the voltages of the second battery devices or the first battery devices become the predetermined voltage.

This permits further reduction of the time necessary for the energy transportation from each of the second battery devices to each of the first battery devices or vice versa.

In accordance with the invention, the controller sets the frequency which is the reciprocal of the sum duration of the ON duration of the second switching devices and the ON duration of the first switching devices, to be a low frequency, thereby increasing the amount of energy transported between each of the second battery devices and each of the first battery devices in a unit time so that the voltages of the second battery devices or the first battery devices become the predetermined voltage in a short time. By virtue of this, the voltages of the second battery devices or the first battery devices are equalized to the predetermined voltage in a shorter time.

In accordance with the invention, when the transportation of a predetermined amount of energy between each of the second battery devices and each of the first battery devices is completed and when the voltages of the second battery devices or the first battery devices have become approximately the predetermined voltage, the controller sets the frequency which is the reciprocal of the sum duration of the ON duration of the second switching devices and the ON duration of the first switching devices, to be a high frequency. This permits reduction of the circulation energy after the equalization is completed, and hence the energy loss is reduced.

In accordance with the invention, when the transportation of a predetermined amount of energy between each of the second battery devices and each of the first battery devices is completed and when the voltages of the second battery devices or the first battery devices have become approximately the predetermined voltage, the controller turns OFF the second switching devices and the first switching devices. By virtue of this, both the second switching devices and the first switching devices are maintained to be OFF simultaneously, whereby energy loss is reduced.

What is claimed is:

1. A voltage equalizing apparatus for battery devices comprising:
   a core;
   a plurality of first battery devices interconnected in series with each other;
   a plurality of secondary windings magnetically connected with each other through the core;
   a plurality of first switching devices, each connected to one of the secondary windings and one of the first battery devices to constitute a first closed circuit;
   a second battery device;
   a primary winding magnetically connected with the secondary windings through the core; and
   a second switching device connected in series with the second battery device and the primary winding to constitute a second closed circuit;
   wherein the first switching devices and the second switching device are alternately turned ON and OFF to equalize the output voltages of the first battery devices;
   when the second switching device is turned ON, exciting energy stored in the core is transported to the first battery devices through the first switching devices; and
   the first switching devices continue to be turned ON after completion of the transportation of the exciting energy.

2. A voltage equalizing apparatus for battery devices comprising:
   a core;
   a plurality of first battery devices interconnected in series with each other;
   a plurality of secondary windings magnetically connected with each other through the core;
   a plurality of first switching devices, each connected to one of the secondary windings and one of the first battery devices to constitute a first closed circuit;
   a second battery device;
   a primary winding magnetically connected with the secondary windings through the core; and
   a second switching device connected in series with the second battery device and the primary winding to constitute a second closed circuit;
   wherein the first switching devices and the second switching device are alternately turned ON and OFF to equalize the output voltages of the first battery devices;
   when the first switching devices are turned ON, exciting energy stored in the core is transported to the second battery device through the second switching device; and
   the second switching device continues to be turned ON after completion of the transportation of the exciting energy.

3. The voltage equalizing apparatus according to claim 1 or 2, further comprising:
   a detector for detecting variation in the output voltages of the first battery devices,
   wherein when the variation is large, the ON duration of the second switching device and/or the first switching devices is extended.

4. The voltage equalizing apparatus according to claim 3, wherein when the variation is small in the output voltages of the first battery devices, the ON/OFF operation of the first switching devices and the second switching device is stopped, and/or the ON duration of the first switching devices and the second switching device is extremely shortened.

5. The voltage equalizing apparatus according to claim 3, wherein when the variation in the output voltages of the first battery devices is smaller than a predetermined value, the ON duration of the first switching devices and/or the second switching device is shortened for reduction of power consumption in equalizing.

6. The voltage equalizing apparatus according to claim 3, wherein when a current greater than or equal to a predetermined value flows through the first battery devices, the ON/OFF operation of the first switching devices and the second switching device is stopped, and/or the ON duration of the first switching devices and the second switching device is extremely shortened.

7. The voltage equalizing apparatus according to claim 3, wherein during an external power supply charges the first battery devices or the first battery devices discharge to an external load, the ON/OFF operation of the first switching devices and the second switching device is stopped, and/or the ON duration of the first switching devices and the second switching device is extremely shortened.

8. The voltage equalizing apparatus according to claim 1, wherein when the first switching devices and the second switching device are alternately turned ON and OFF, there is a pause in an interval from the switching-OFF of the first switching devices to the switching-ON of the second switching device and in an interval from the switching-OFF of the second switching device to the switching-ON of the first switching devices.

9. An apparatus for equalizing circuit voltages, comprising:
   (a) a plurality of first circuits, each including:
       a core;
       a plurality of first battery devices interconnected in series with each other;
       a plurality of secondary windings magnetically connected with each other through the core; and
       a plurality of first switching devices, each connected to one of the secondary windings and one of the first battery devices to constitute a first closed circuit;

(b) a plurality of circuit equalizing windings, magnetically connected with the secondary windings through the cores, respectively, the circuit equalizing windings connected in parallel with each other; and (c) a second circuit including:
a second battery device;
an exciting winding magnetically connected with the secondary windings and the circuit equalizing windings; and
a second switching device connected in series with the second battery device and the exciting winding to constitute a second closed circuit,
wherein when the second switching device is turned ON, exciting energy stored in the cores is transported to the first battery devices through the first switching devices; and
the first switching devices continue to be turned ON after completion of the transportation of the exciting energy.

10. An apparatus for equalizing circuit voltages, comprising:

(a) a plurality of first circuits, each including:
a core;
a plurality of first battery devices interconnected in series with each other;
a plurality of secondary windings magnetically connected with each other through the core; and
a plurality of first switching devices, each connected to one of the secondary windings and one of the first battery devices to constitute a first closed circuit;

(b) a plurality of circuit equalizing windings, magnetically connected with the secondary windings through the cores, respectively, the circuit equalizing windings connected in parallel with each other; and (c) a second circuit including:
a second battery device;
an exciting winding magnetically connected with the secondary windings and the circuit equalizing windings; and
a second switching device connected in series with the second battery device and the exciting winding to constitute a second closed circuit,
wherein when the first switching devices are turned ON, exciting energy stored in the cores is transported to the second battery device through the second switching device; and
the second switching device continues to be turned ON after completion of the transportation of the exciting energy.

11. The apparatus according to claim 9 or 10, the exciting winding is one of the circuit equalizing winding.

12. A voltage equalizing apparatus for battery devices comprising:
a core;
a plurality of first battery devices interconnected in series with each other;
a plurality of secondary windings magnetically connected with each other through the core;
a plurality of first switching devices, each connected to one of the secondary windings and one of the first battery devices to constitute a first closed circuit;
a second battery device;
a primary winding magnetically connected with the secondary windings through the core;
a second switching device connected in series with the second battery device and the primary winding to constitute a second closed circuit; and
a controller for outputting a control signal for controlling the second switching device and the first switching devices to be alternately turned ON and OFF, thereby causing the energy transportation between the second battery device and each of the first battery devices to equalize the voltages of the first battery devices;
wherein the controller sets the ON-duration ratio between the ON duration of the second switching device and the ON duration of the first switching devices so that the voltages of the first battery devices are to be a predetermined voltage.

13. A voltage equalizing apparatus for battery devices comprising:
a core;
a plurality of first battery devices interconnected in series with each other;
a plurality of secondary windings magnetically connected with each other through the core;
a plurality of first switching devices, each connected to one of the secondary windings and one of the first battery devices to constitute a first closed circuit;
a second battery device;
a primary winding magnetically connected with the secondary windings through the core;
a second switching device connected in series with the second battery device and the primary winding to constitute a second closed circuit; and
a controller for outputting a control signal for controlling the second switching device and the first switching devices to be alternately turned ON and OFF, thereby causing the energy transportation between the second battery device and each of the first battery devices to equalize the voltages of the first battery devices;
wherein the controller sets the ON-duration ratio between the ON duration of the second switching device and the ON duration of the first switching devices so that the voltages of the first battery devices is to exceed a predetermined voltage; and
wherein the controller resets the ON-duration ratio so that the voltages of the first battery devices become the predetermined voltage before the voltages of the first battery devices exceed the predetermined voltage.

14. The voltage equalizing apparatus for battery devices according to claim 12 or 13, wherein a frequency is defined by a reciprocal of the sum of the ON duration of the second switching device and the ON duration of the first switching devices; and
the controller sets the frequency to be lower than a normal value to increase the amount of energy transported between the second battery device and each of the first battery device in a unit time so that the voltages of the first battery devices become the predetermined voltage in a short time.

15. The voltage equalizing apparatus according to claim 14, wherein the controller sets the frequency to be higher than the normal value, when the transportation of a predetermined amount of energy between the second battery device and each of the first battery devices is completed and when the voltages of the first battery devices have become approximately the predetermined voltage.

16. The voltage equalizing apparatus according to claim 14, wherein the controller turns OFF the second switching device and the first switching devices, when the transportation of a predetermined amount of energy between the second battery device and each of the first battery devices is completed and when the voltages of the first battery devices have become approximately the predetermined voltage.

17. The voltage equalizing apparatus according to claim 12 or 13, wherein the second closed circuit further comprises:

a third switching device; and a third battery device, wherein a closed circuit is formed by the second battery device, the third switching device, and the third battery device;

wherein a closed circuit is formed by the primary winding, the second switching device, and the third battery device; and wherein upon completion of the transportation of a predetermined amount of energy between the second battery device and each of the first battery devices, the controller turns OFF the third switching device and continues the operation of the second switching device and the first switching devices, thereby continuing the equalization of the voltages of the first battery devices.

18. A voltage equalizing apparatus for battery devices comprising:

a core;

a plurality of first battery devices interconnected in series with each other;

a plurality of secondary windings magnetically connected with each other through the core;

a plurality of first switching devices, each connected to one of the secondary windings and one of the first battery devices to constitute a first closed circuit;

a plurality of second battery device interconnected in series with each other;

a plurality of primary windings magnetically connected with each other through the core, and the primary windings magnetically connected with the secondary windings through the core;

a plurality of second switching devices, each connected in series with one of the second battery devices and one of the primary windings to constitute a second closed circuit; and a controller for outputting a control signal for controlling the second switching devices and the first switching devices to be alternately turned ON and OFF, thereby causing the energy transportation between each of the second battery devices and each of the first battery devices to equalize the voltages of the second battery devices and/or the first battery devices;

wherein the controller sets the ON-duration ratio between the ON duration of the second switching devices and the ON duration of the first switching devices so that the voltages of the second battery devices or the first battery devices become a predetermined voltage.

19. A voltage equalizing apparatus for battery devices comprising:

a core;

a plurality of first battery devices interconnected in series with each other;

a plurality of secondary windings magnetically connected with each other through the core;

a plurality of first switching devices, each connected to one of the secondary windings and one of the first battery devices to constitute a first closed circuit;

a plurality of second battery device interconnected in series with each other;

a plurality of primary windings magnetically connected with each other through the core, and the primary windings magnetically connected with the secondary windings through the core;

a plurality of second switching devices, each connected in series with one of the second battery devices and one of the primary windings to constitute a second closed circuit; and a controller for outputting a control signal for controlling the second switching devices and the first switching devices to be alternately turned ON and OFF, thereby causing the energy transportation between each of the second battery devices and each of the first battery devices to equalize the voltages of the second battery devices and/or the first battery devices;

wherein the controller sets the ON-duration ratio between the ON duration of the second switching devices and the ON duration of the first switching devices so that the voltages of the second battery devices or the first battery devices exceed a predetermined voltage; and the controller resets the ON-duration ratio so that the voltages of the second battery devices or the first battery devices become the predetermined voltage before the voltages of the second battery devices or the first battery devices exceed the predetermined voltage.

20. The voltage equalizing apparatus according to claim 18 or 19, wherein a frequency is defined by a reciprocal of the sum duration of the ON duration of the second switching devices and the ON duration of the first switching devices;

the controller sets the frequency to be a low frequency, thereby increasing the amount of energy transported between each of the second battery devices and each of the first battery devices in a unit time so that the voltages of the second battery devices or the first battery devices become the predetermined voltage in a short time.

21. The voltage equalizing apparatus according to claim 20, wherein the controller sets the frequency to be a high frequency, when the transportation of a predetermined amount of energy between each of the second battery devices and each of the first battery devices is completed and when the voltages of the second battery devices or the first battery devices have become approximately the predetermined voltage.

22. The voltage equalizing apparatus according to claim 20, wherein the controller turns OFF the second switching devices and the first switching devices, when the transportation of a predetermined amount of energy between each of the second battery devices and each of the first battery devices is completed and when the voltages of the second battery devices or the first battery devices have become approximately the predetermined voltage.

* * * * *